(12) United States Patent
Wakamoto et al.

(10) Patent No.: US 10,067,726 B2
(45) Date of Patent: Sep. 4, 2018

(54) DISPLAY DEVICE FOR VEHICLE

(71) Applicant: Fuji Jukogyo Kabushiki Kaisha, Tokyo (JP)

(72) Inventors: Naoki Wakamoto, Tokyo (JP); Makoto Niwa, Tokyo (JP); Daigo Konno, Tokyo (JP)

(73) Assignee: Subaru Corporation, Tokyo (JP)

( * ) Notice: Subject to any disclaimer, the term of this patent is extended or adjusted under 35 U.S.C. 154(b) by 207 days.

(21) Appl. No.: 14/229,037

(22) Filed: Mar. 28, 2014

(65) Prior Publication Data
US 2014/0292695 A1 Oct. 2, 2014

(30) Foreign Application Priority Data

| Mar. 29, 2013 | (JP) | ................................ 2013-073387 |
| Mar. 29, 2013 | (JP) | ................................ 2013-073388 |
| Mar. 29, 2013 | (JP) | ................................ 2013-073391 |
| Mar. 29, 2013 | (JP) | ................................ 2013-073392 |
| Mar. 29, 2013 | (JP) | ................................ 2013-073393 |
| Mar. 29, 2013 | (JP) | ................................ 2013-073394 |

(51) Int. Cl.
| G09G 5/00 | (2006.01) |
| G06F 3/14 | (2006.01) |
| B60K 35/00 | (2006.01) |
| B60K 37/06 | (2006.01) |

(52) U.S. Cl.
CPC ............ *G06F 3/1423* (2013.01); *B60K 35/00* (2013.01); *B60K 37/06* (2013.01); *B60K 2350/1024* (2013.01); *B60K 2350/2056* (2013.01)

(58) Field of Classification Search
None
See application file for complete search history.

(56) References Cited

U.S. PATENT DOCUMENTS

| 7,413,233 | B1 | 8/2008 | Jung |
| 8,474,860 | B2 | 7/2013 | Ohoka et al. |
| 8,565,829 | B2 * | 10/2013 | Kim ................ G06F 1/1616 345/173 |
| 2004/0135741 | A1 | 7/2004 | Tomisawa et al. |
| 2004/0233275 | A1 | 11/2004 | Tomita |

(Continued)

FOREIGN PATENT DOCUMENTS

| JP | S61-057434 A | 3/1986 |
| JP | H04-195882 A | 7/1992 |

(Continued)

OTHER PUBLICATIONS

Japanese Office Action dated Sep. 27, 2016 issued in corresponding Japanese Patent Application No. 2013-073387.

(Continued)

*Primary Examiner* — Ifedayo Iluyomade
(74) *Attorney, Agent, or Firm* — Troutman Sanders LLP

(57) ABSTRACT

A display device for a vehicle includes an operating unit which a passenger can operate, and a display unit which displays various types of images based on an operation input at the operating unit. The operating unit and display unit are disposed separated from each other. The operating unit is situated between the eyes of a driver performing the operation input and the display unit, and overlays the display unit on the line-of-sight direction of the driver performing the operation input.

14 Claims, 27 Drawing Sheets

(56) References Cited

U.S. PATENT DOCUMENTS

| | | | | |
|---|---|---|---|---|
| 2009/0132130 A1* | 5/2009 | Kumon | ............... | B60K 35/00 |
| | | | | 701/49 |
| 2009/0189373 A1* | 7/2009 | Schramm | ............ | B60K 35/00 |
| | | | | 280/731 |
| 2010/0182411 A1* | 7/2010 | Lapstun | ............... | B41J 3/445 |
| | | | | 348/61 |
| 2012/0272179 A1* | 10/2012 | Stafford | .............. | G06F 3/012 |
| | | | | 715/781 |
| 2013/0093860 A1 | 4/2013 | Shimotani et al. | | |
| 2014/0049622 A1 | 2/2014 | Tsurumi et al. | | |

FOREIGN PATENT DOCUMENTS

| | | | |
|---|---|---|---|
| JP | H05-294192 A | | 11/1993 |
| JP | H09-167049 A | | 6/1997 |
| JP | 2001021316 | * | 1/2001 |
| JP | 2002225724 | * | 1/2001 |
| JP | 2002-225724 A | | 8/2002 |
| JP | 2003-267165 A | | 9/2003 |
| JP | 2004-151513 A | | 5/2004 |
| JP | 2007-168521 A | | 7/2007 |
| JP | 2008-265473 A | | 11/2008 |
| JP | 2010-163114 A | | 7/2010 |
| JP | 2010-221774 A | | 10/2010 |
| JP | 2010-267192 A | | 11/2010 |
| JP | 2011-207247 A | | 10/2011 |
| JP | 2012-022393 A | | 2/2012 |
| JP | 2012-071687 A | | 4/2012 |
| JP | 2012-194760 A | | 10/2012 |
| JP | 2012-230478 A | | 11/2012 |
| JP | 2012-248979 A | | 12/2012 |
| WO | 2001-057638 A1 | | 8/2001 |
| WO | 2004-084560 A1 | | 9/2004 |
| WO | 2012-053033 A1 | | 4/2012 |

OTHER PUBLICATIONS

Japanese Office Action dated Oct. 4, 2016 issued in corresponding Japanese Patent Application No. 2013-073388.
Japanese Office Action dated Oct. 4, 2016 issued in corresponding Japanese Patent Application No. 2013-073391.
Japanese Office Action dated Oct. 4, 2016 issued in corresponding Japanese Patent Application No. 2013-073393.
Japanese Office Action dated Oct. 18, 2016 issued in corresponding Japanese Patent Application No. 2013-073392.
Japanese Office Action dated Oct. 18, 2016 issued in corresponding Japanese Patent Application No. 2013-073394.
Japanese Office Action dated Apr. 25, 2017 issued in corresponding Japanese Patent Application No. 2013-073387.
Japanese Office Action dated Apr. 25, 2017 issued in corresponding Japanese Patent Application No. 2013-073388.
Japanese Office Action dated Apr. 25, 2017 issued in corresponding Japanese Patent Application No. 2013-073391.
Japanese Office Action dated Apr. 19, 2017 issued in corresponding Japanese Patent Application No. 2013-073393.
Office Action dated Apr. 24, 2018 during the prosecution of Japanese Patent Application No. 2017-106179.

\* cited by examiner

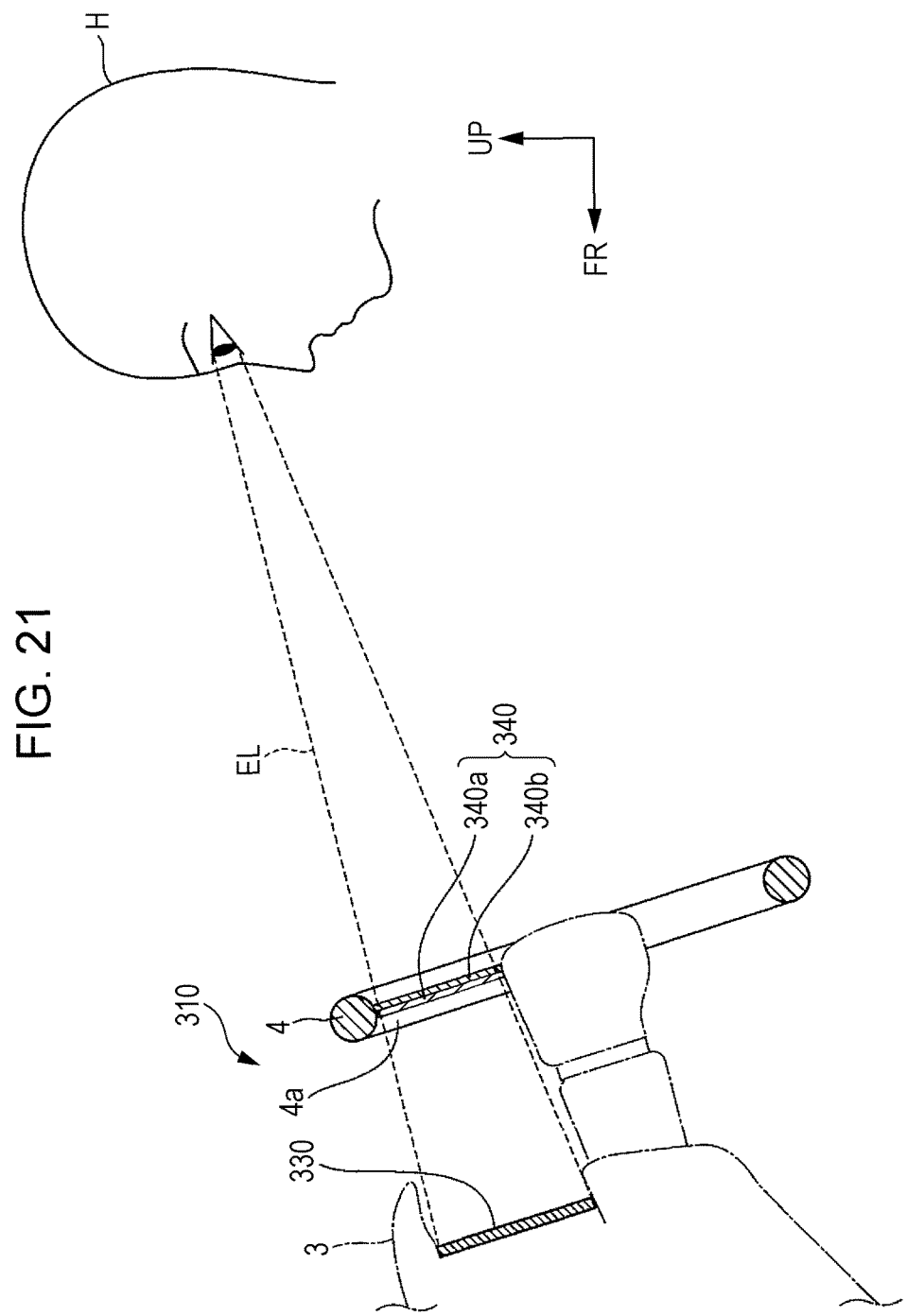

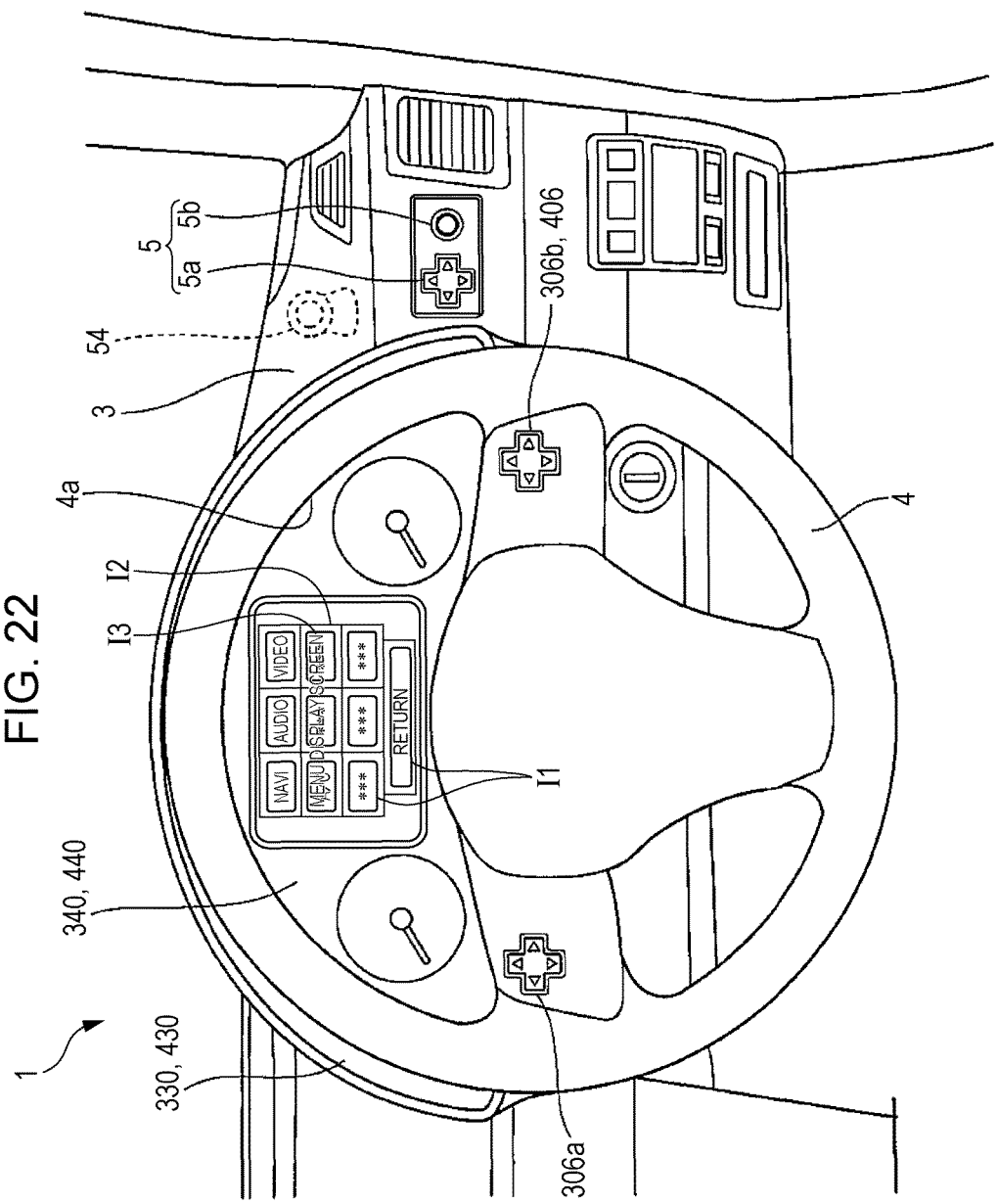

DISPLAY DEVICE FOR VEHICLE

CROSS-REFERENCE TO RELATED APPLICATIONS

The present application claims priority from Japanese Patent Application Nos. 2013-073387, 2013-073388, 2013-073391, 2013-073392, 2013-073393, and 2013-073394, all filed on Mar. 29, 2013, the entire contents of which are hereby incorporated by reference.

BACKGROUND

1. Technical Field

The present invention relates to a display device for a vehicle.

2. Related Art

Heretofore, there have been known display devices for a vehicle which can display various types of information, such as map information. Such a display device for a vehicle is disposed, for example, in an instrument panel of an automobile, at the middle thereof in the width direction (see Japanese Unexamined Patent Application Publication (JP-A) No. 2010-163114).

Generally, such display devices for a vehicle have an integrally-formed display and operating unit. The display serves as a display unit, and the operating unit is arranged so as to enable input of various types of information (e.g., a touch panel). Accordingly, the driver or a passenger seated in the automobile has to reach forward to operate the operating unit, which is problematic in terms of operability.

There has been proposed a display device of which the display is disposed in an instrument panel, at the middle thereof in the width direction, while operating buttons serving as the operating unit are provided to the steering wheel (see Publication (JP-A) No. 2012-022393). This display device allows the driver to operate the operating unit without reaching forward, thereby improving operability.

Now, display devices for a vehicle of which the display unit and operating unit are provided separately, such as in JP-A No. 2012-022393, are often operated by the user looking at the operating unit while operating. This means that the user will be looking at the display unit (instrument panel), and then the operating unit (steering wheel), back to the display unit (instrument panel), and so on, when operating the operating unit to display various types of information on the display unit. Thus, the display device disclosed in JP-A No. 2012-022393 does have improved operability, but is insufficient with regard to ease of visual recognition, since the user has to continuously move the line of sight back and forth.

On the other hand, Japanese Unexamined Patent Application Publication (JP-A) No. 2012-071687 discloses a display device with an integrated display and touch panel provided to the steering wheel. Now, the posture of the driver seated in the driver's seat differs depending on the body type of the driver. For example, some drivers prefer to sit in the driver's seat with the torso and the steering wheel in relatively close proximity. A driver in such a seating posture will have no problem in particular in viewing display information displayed on a display device where a display and touch panel have been integrated such as disclosed in JP-A No. 2012-071687. However, operation of the touch panel will be difficult, since of the proximity to the driver.

Also, drivers generally tend to view the touch panel while operating the touch panel. The display device disclosed in JP-A No. 2012-071687 will have the line of sight of the driver oriented somewhat downwards when a driver having such a seating posture as described above operates the touch panel. This means that to operate the touch panel while driving, the driver has to move his/her line of sight up and down between the outside, ahead of the automobile, and the touch panel, which is a fairly large movement. Further, the driver has to focus back and forth between faraway (outside the automobile) and up close (the touch panel), which is not necessarily suitable.

Now, such display devices generally tend to have a small-sized display screen, due to dimensional restrictions within the cabin. Accordingly, displaying a great amount of information on such a display device results in the display size of the information being small, and hence difficult to view.

SUMMARY OF THE INVENTION

The present invention has been made to solve the above-described inconveniences, and accordingly it is an object thereof to provide a display device for a vehicle in which both operability and improved ease of visual recognition are realized.

It is another object of the present invention to provide a display device for a vehicle which enables displaying a great amount of information at once without reducing the display size, thus enabling good visual recognition.

An aspect of the present invention provides a display device for a vehicle including: an operating unit to receive an operation input from a passenger; and a display unit to display various types of information based on the operation input from the operating unit. The operating unit and the display unit are disposed separated from each other, and the operating unit is situated between the eyes of the passenger performing the operation input and the display unit, and situated at a position overlaying the display unit in the line of sight of the passenger performing operation input.

Another aspect of the present invention provides a display device for a vehicle including: an operating unit to receive operation input from a passenger; and a display unit to display various types of display information based on the operation input by the operating unit. The operating unit and the display unit are disposed separated from each other, and the display unit is situated between the eyes of the passenger performing the operation input and the operating unit, and situated at a position overlaying the operating unit in the line of sight of the passenger performing operation input.

Another aspect of the present invention provides a display device for a vehicle including: a first display unit situated toward the front of the vehicle from a passenger seated in a seat; and a second display unit formed of a transparent or semi-transparent material, which is disposed separated from the first display unit. The second display unit is situated between the eyes of the passenger viewing a display screen of the first display unit and the first display unit, and situated at a position overlaying the first display unit in the line of sight of the passenger viewing the display screen of the first display unit.

BRIEF DESCRIPTION OF THE DRAWINGS

FIGS. 20A and 20B are diagrams illustrating a modification of providing the input panel to the steering wheel, in which FIG. 20A is a frontal view, and FIG. 20B is a cross-sectional view taken along XXB-XXB in FIG. 20A;

FIG. 21 is a side view illustrating the positional relation between driver, display panel, and input panel, in a fourth implementation of the present invention;

FIG. 22 is a front view illustrating the display panel and input panel as viewed from the driver's seat;

FIGS. 25A and 25B are diagrams illustrating an image displayed on the input panel, in which FIG. 25A is a perspective view for describing a case of the passenger viewing images displayed on each of the input panel and display panel, and FIG. 25B is a diagram for describing the image as viewed from the passenger in the state illustrated in FIG. 25A;

DETAILED DESCRIPTION

First Implementation

Figure 1:
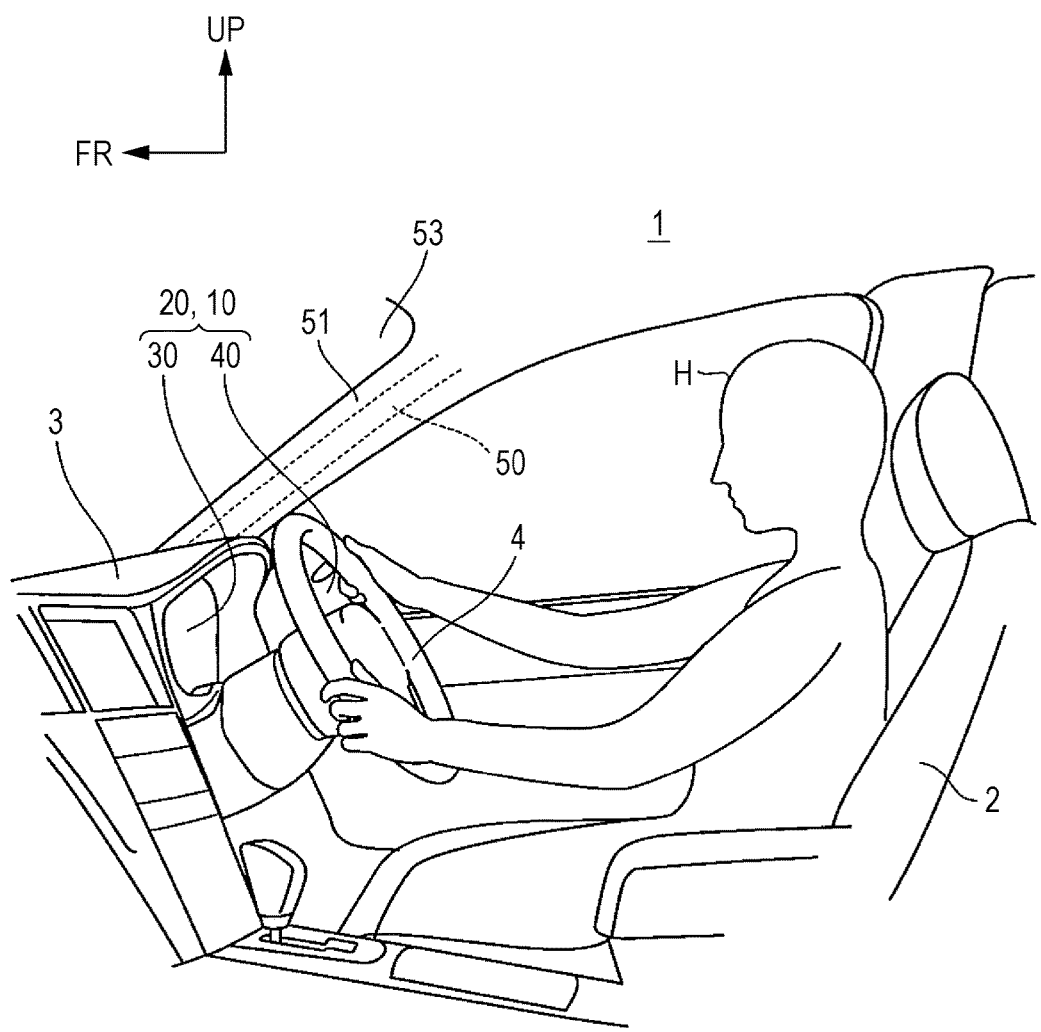
FIG. 1 is a perspective view illustrating inside of a cabin of a vehicle, according to a first implementation of the present invention.
Figure 2:
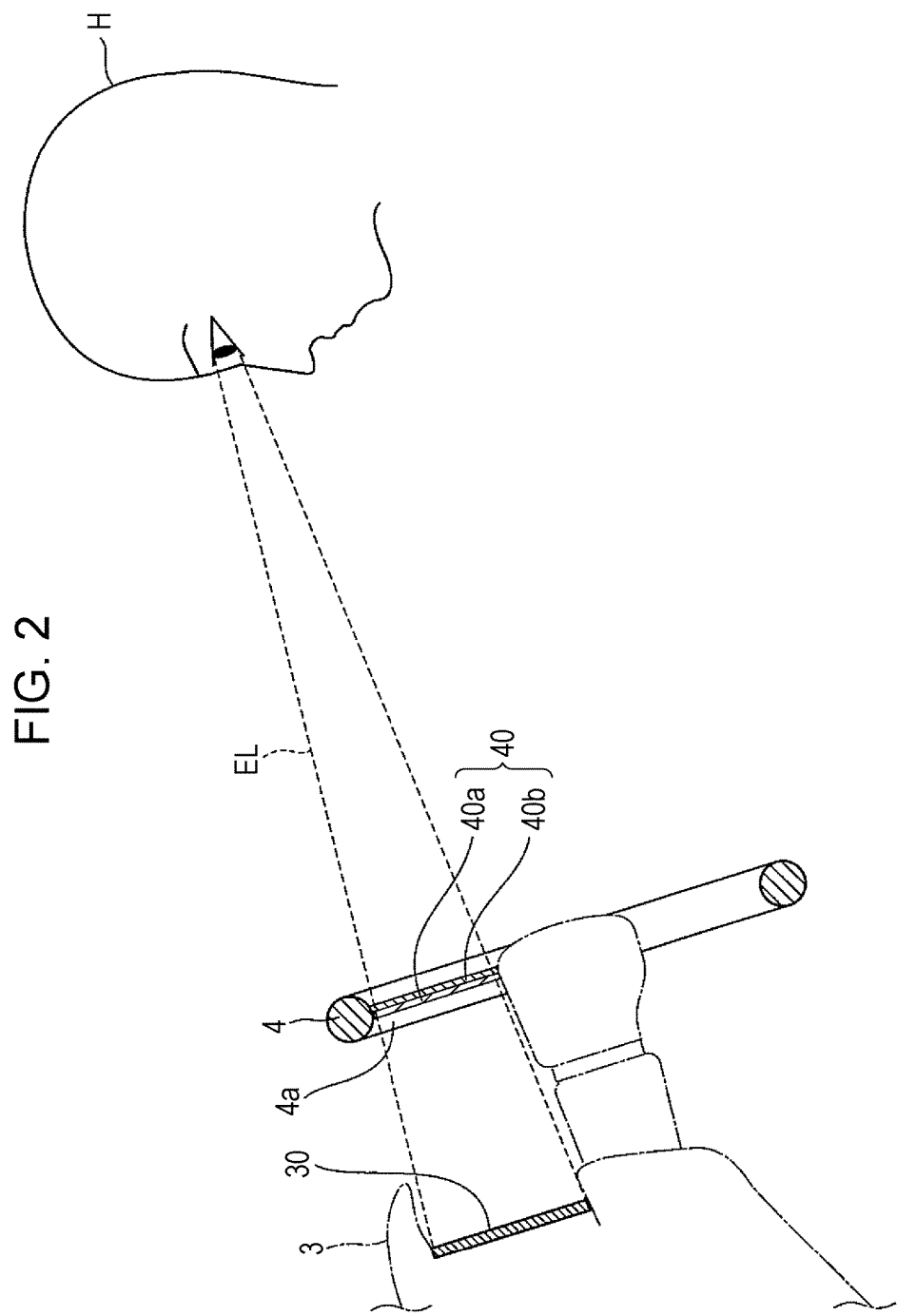
FIG. 2 is a side view illustrating the positional relation between driver, display panel, and input panel.
Figure 3:
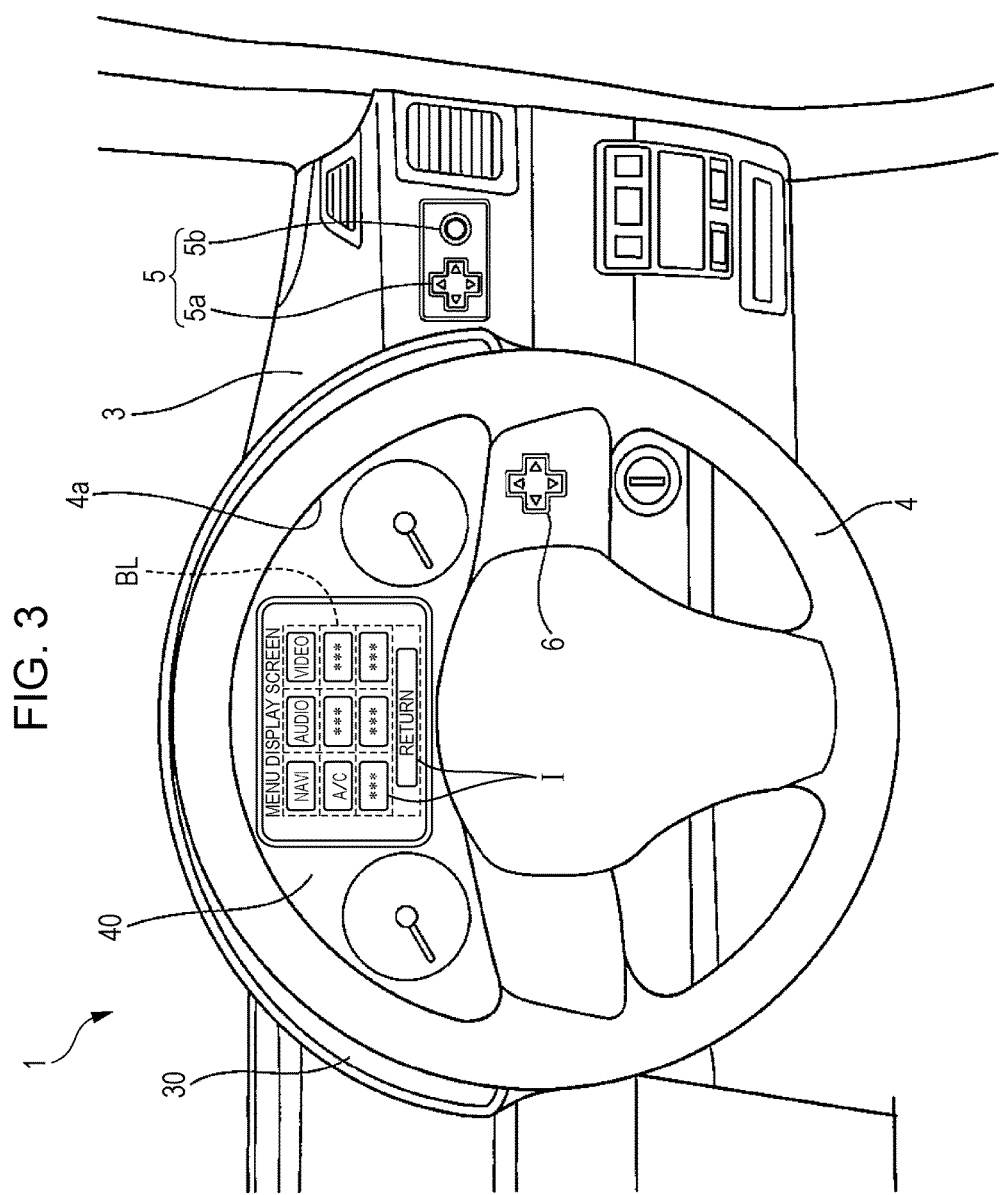
FIG. 3 is a front view illustrating the display panel and input panel as viewed from the driver's seat.
Figure 4:
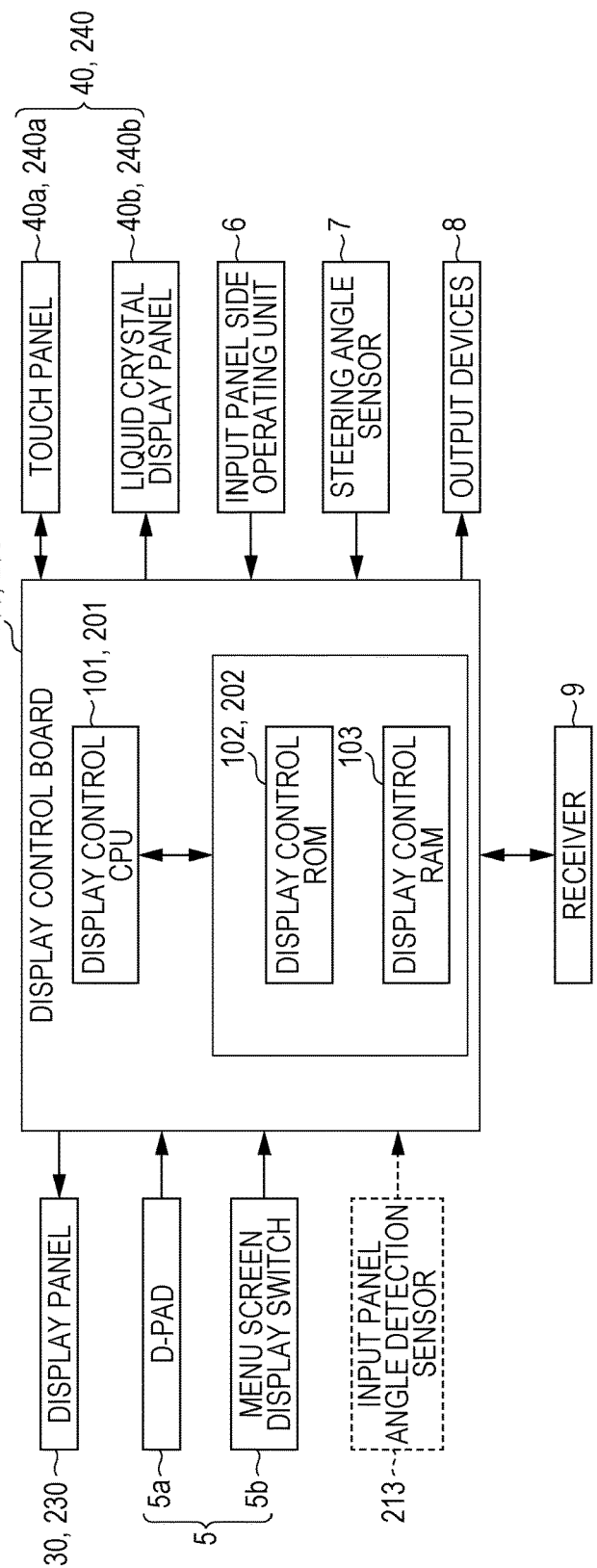
FIG. 4 is a block diagram for describing a control system provided to an automotive display system.
Figure 5:
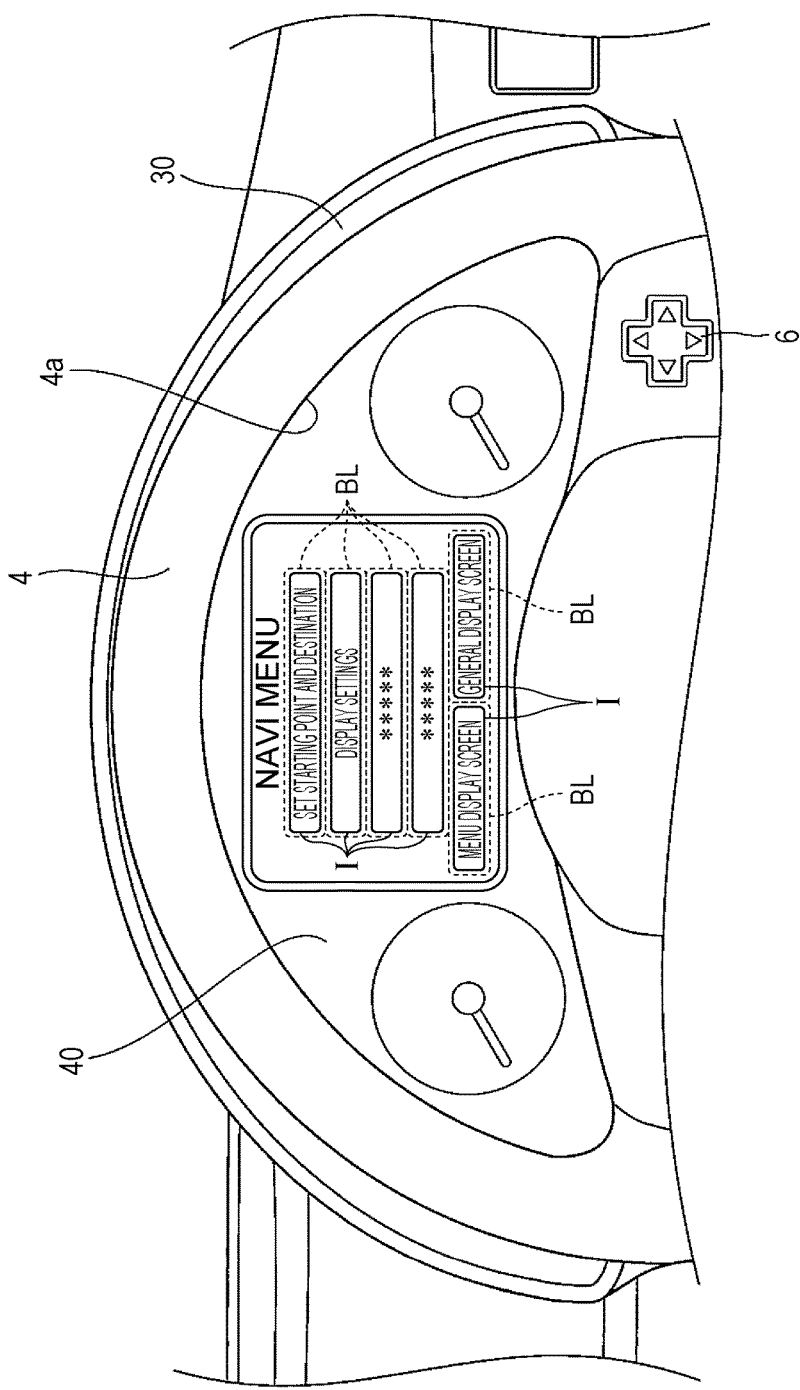
FIG. 5 is a diagram describing a "navigation menu screen", as an example of an image displayed on the display panel.
Figure 6:
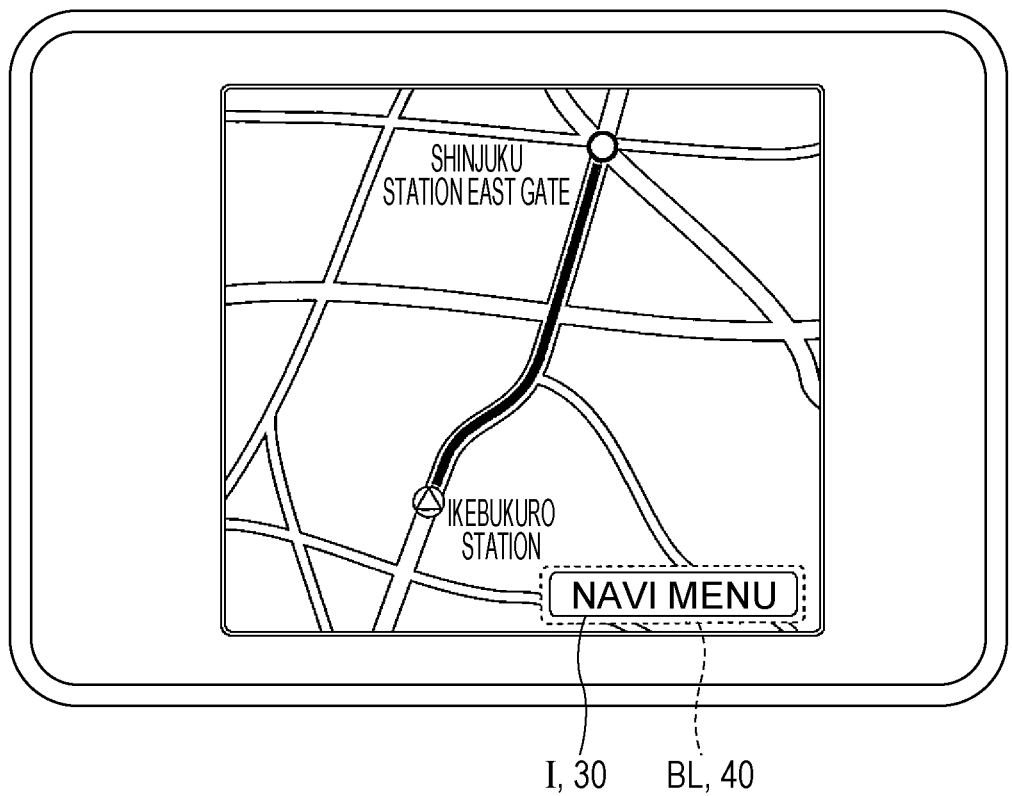
FIG. 6 is a diagram describing a navigation screen, as an example of an image displayed on the display panel.

A first implementation of the present invention will be described based on the drawings. FIG. 1 is a perspective view illustrating inside of a cabin of a vehicle, according to a first implementation of the present invention, FIG. 2 is a side view illustrating the positional relation between driver, display panel, and input panel, FIG. 3 is a front view illustrating the display panel and input panel as viewed from the driver's seat, FIG. 4 is a block diagram for describing a control system provided to an automotive information display system, FIG. 5 is a diagram describing a "navigation menu screen", as an example of an image displayed on the display panel, and FIG. 6 is a diagram describing a navigation screen, as an example of an image displayed on the display panel. Also, "FR" in FIG. 1 indicates the forward direction of the automobile, and "UP" indicates the upward direction. The terms "left" and "right" as used in the following description means left and right as to a passenger or the driver seated in the vehicle.

An automotive information display system 10 according to the present implementation as illustrated in FIG. 1 includes a display device 20. The display device 20 is installed within the cabin of an automobile 1 or some other like vehicle. The display device 20 includes a display panel 30 and an input panel 40. Note that the display device 20 and display panel 30 correspond to "display device for a vehicle" and "display unit" according to an aspect of the invention.

The automobile 1 includes a driver's seat 2, an instrument panel 3 disposed in front of the driver's seat 2, and a steering wheel 4 situated between the driver's seat 2 and the instrument panel 3. The steering wheel 4 is configured so as to be capable of moving vertically by operating a tilt lever (omitted from illustration). The steering wheel 4 corresponds to the "steering wheel" according to an aspect of the invention.

The display panel 30 is a so-called liquid crystal display device where a liquid crystal panel and a backlight are formed integrally, for example, as illustrated in FIGS. 2 and 3. The display panel 30 is attached to the instrument panel 3 which is toward the front side of the automobile from the driver's seat 2. The driver H can see various types of images displayed on the display screen of the display panel 30 through an upper space 4a of the steering wheel 4. Note that the display panel 30 is not restricted to being a liquid crystal display device. Self-emitting display devices such as plasma display devices, organic EL display devices, and so forth, may be employed.

The display panel 30 can be switched to display various types of images, including images display common automobile information such as traveling speed of the automobile 1 (speedometer) and revolutions of the engine per unit time (tachometer), and also navigation images displaying map information images, and so forth.

The various types of images displayed on the display panel 30 will be described with reference to FIGS. 3 and 5. As illustrated in FIG. 3, a display-panel-side operating unit 5 is provided to the instrument panel 3 at the right side of where the display panel 30 is situated. The display-panel-side operating unit 5 includes a D-pad 5a, and a menu screen display switch 5b which is provided to the right side of the D-pad 5a.

The D-pad 5a has an upper end, a lower end, a left end, and a right end, so that pressing one of these ends enables the entire image displayed on the display panel 30 to be moved. For example, if the driver H is pressing the upper end, the image displayed on the display panel 30 will continue to be scrolled upwards as long as the upper end is being pressed. While the present implementation is configured such that the entire image displayed on the display panel 30 is moved by operating the D-pad 5*a*, a configuration may be where this is realized by operation input at a later-described touch panel 40*a* (e.g., a flicking operation).

The menu screen display switch 5*b* is a pressing switch. Pressing the menu screen display switch 5*b* can display a "menu display screen" such as illustrated in FIG. 3 on the display panel 30. The "menu display screen" has displayed therein multiple selection images (icon images) I, such as "NAVI", "AUDIO", "VIDEO", "A/C", "RETURN", and so forth.

The driver H can select one of the selection images I by the input panel 40 to display an initial image corresponding to the function of the selected selection image I on the display panel 30, which will be described in detail later. More specifically, in the event that the driver H selects the selection image I "NAVI" from the "menu display screen" (see FIG. 3), a "NAVI MENU SCREEN" (see FIG. 5) capable of making various settings or the like regarding the navigation function is displayed on the display panel 30, instead of the "menu display screen".

In the present implementation, display screens for the "menu display screen" and the various functions (e.g., navigation function) are displayed at a relatively large size at the middle of the display panel 30 in the width direction. In a state where such display screens are displayed, the speedometer, tachometer, and so forth are displayed on both the right and left sides of the display screen. In cases where the "menu display screen" and the display screens for the various functions are not displayed on the display panel 30, a general image indicating automobile information (speedometer, tachometer, etc.) alone are displayed on the display panel 30. This display (omitted from illustration) will be referred to hereinafter as a "general display screen".

Next, the input panel 40 will be described with reference to FIGS. 2 and 3. As illustrated in FIGS. 2 and 3, the input panel 40 includes a touch panel 40*a* capable of receiving operation input by bringing a finger or the like into contact with or into close proximity with the operating surface, and a liquid crystal display panel 40*b* layered on the face of the touch panel 40*a* toward the front of the automobile. The touch panel 40*a* and liquid crystal display panel 40*b* are both formed of a transparent material. Known arrangements may be used for each. The touch panel 40*a* above corresponds to the "operating unit" according to an aspect of the invention.

The input panel 40 has generally the same shape as the upper space 4*a* of the steering wheel 4, and is fixed to the opening perimeter of the upper space 4*a*. That is to say, the driver H can view the image displayed on the display panel 30 via the input panel 40 in the present implementation. Note that the input panel 40 may be formed of a semi-transparent material instead of a transparent material. However, as much transparency as possible is desirable, taking into consideration ease of visual recognition of the image displayed on the display panel 30.

A dotted line BL is displayed on the liquid crystal display panel 40*b*, so the deriver H can recognize the area of the touch panel 40*a* which is operable (hereinafter referred to as "operable region"). The dotted line BL is displayed in a size slightly larger than the size of the selection images I displayed on the display panel 30.

For example, in a state where a menu setting screen is displayed, on the display panel 30, the dotted line BL is displayed at a position corresponding to the selection images I displayed in the menu setting screen ("NAVI", "AUDIO", etc.), as illustrated in FIG. 3. The driver H can select a selection image I (e.g., "NAVI") displayed in the menu setting screen by touching a part of the region encompassed by the dotted line BL by way of the touch panel 40*a*.

Also, the dotted line BL displayed on the operable region of the touch panel 40*a* and the liquid crystal display panel 40*b* is changed in accordance (coordination) with the display image displayed on the display panel 30.

For example, in a case where the driver H touches the operable region of the touch panel 40*a* corresponding to the selection image I for "NAVI" (see FIG. 3), and a "NAVI MENU screen" is displayed on the display panel 30, the liquid crystal display panel 40*b* displays the dotted line BL at the position corresponding to the selection images I displayed in the "NAVI MENU screen" (e.g., selection image I for "SET STARTING POINT AND DESTINATION"), as illustrated in FIG. 5. The driver H can select a selection image I displayed in the "NAVI MENU screen" (e.g., selection image I for "SET STARTING POINT AND DESTINATION") by touching or the like a region encompassed by the dotted line BL by way of the touch panel 40*a*.

The dotted line BL displayed on the liquid crystal display panel 40*b* (and the selectable region of the touch panel 40*a*) can be moved by operating a input-panel-side operating unit 6 provided at a predetermined position on the steering wheel 4, in the same way as with the image displayed on the display panel 30, as illustrated in FIG. 3. The input-panel-side operating unit 6 is a D-pad switch the same as the D-pad 5*a* of the display-panel-side operating unit 5, and has an upper end, a lower end, a left end, and a right end, so that pressing one of these ends enables the dotted line BL displayed on the liquid crystal display panel 40*b* (selectable region on the touch panel 40*a*) to be moved. For example, if the driver H is pressing the upper end, the dotted line BL displayed on the liquid crystal display panel 40*b* will continue to be scrolled upwards as long as the upper end is being pressed.

The driver H can situate the selection images I (display panel 30) in the region encompassed by the dotted line BL (liquid crystal display panel 40*b*) on the line-of-sight direction EL of the driver H viewing the display panel 30. The driver H can adjust the position in this way, and then select the selection image I corresponding to this region by performing touching or the like of the region surrounded by the dotted line BL. Such positional adjustment may be performed by moving the steering wheel 4 vertically, or operating the D-pad 5*a* of the display-panel-side operating unit 5, besides operating the input-panel-side operating unit 6. While the present implementation is configured such that the dotted line BL is moved by operating the input-panel-side operating unit 6, a configuration may be where the dotted line BL is moved by operation input at the touch panel 40*a* (e.g., a flicking operation), for example. Also, an arrangement may be made wherein the position of the dotted line BL is adjusted as described above, and thereafter the dotted line BL is not displayed on the liquid crystal display panel 40*b*.

Next, the control system provided in the automotive information display system 10 will be described with reference to FIG. 4. As illustrated in FIG. 4, the control system primarily includes a display control board 100, the display panel 30, the input panel 40 (touch panel 40*a* and liquid crystal display panel 40*b*), the display-panel-side operating unit 5 (D-pad 5*a* and menu screen display switch 5*b*), the input-panel-side operating unit 6, a steering angle sensor 7 provided to a predetermined position on the automobile 1, various types of output devices 8 and a receiver 9, which are connected by wiring cables.

The display control board 100 is provided in the display panel 30 or the like, and has a display control CPU 101, a display control ROM 102, and a display control RAM 103. The display control CPU 101 reads in system programs and the like stored in the display control ROM 102 beforehand, outputs image data to the display panel 30 and touch panel 40a based on the information input from the liquid crystal display panel 40b and so forth, and also outputs operable region specifying data to the touch panel 40a. The display control CPU 101 also outputs audio data to the various types of output devices 8, such as speakers installed in the automobile 1, as necessary at this time.

For example, if a menu screen display signal has been input by the user pressing the menu screen display switch 5b, the display control CPU 101 outputs menu screen display data to the display panel 30, and also outputs dotted line display data to the liquid crystal display panel 40b to display the dotted line BL. At this time, the display control CPU 101 outputs operable region specifying data to the touch panel 40a, so that the region encompassed by the dotted line BL is an operable region.

Accordingly, the "menu display screen" is displayed on the display panel 30, and also the dotted line BL is displayed at the position on the liquid crystal display panel 40b corresponding to the selection images I in the menu display screen (see FIG. 3). Further, the region encompassed by the dotted line BL is enabled as an operable region.

Also, the display control CPU 101 outputs to the liquid crystal display panel 40b and touch panel 40a a non-display signal to not display the dotted line BL and an operation disable signal to disable the enabled operable region, respectively, based on steering angle data input from the steering angle sensor 7 which detects a steering angle θ of the steering wheel 4. Specifically, if the steering angle data input from the steering angle sensor 7 is not within a predetermined range (e.g., −3 degrees≤steering angle θ≤+3 degrees), the display control CPU 101 determines that the steering wheel 4 is at a position where operation input by the touch panel 40a cannot be made, and accordingly outputs the operation disable signal and the non-display signal to the touch panel 40a and liquid crystal display panel 40b, respectively. Thus, even if the "menu display screen" such as illustrated in FIG. 3 is displayed on the display panel 30, for example, the dotted line BL is not displayed on the liquid crystal display panel 40b, and even if the driver H touches the touch panel 40a, the operation is invalid.

On the other hand, if operation of the steering wheel 4 brings the data input from the steering angle sensor 7 to the above range, the display control CPU 101 outputs the operable region specifying data and dotted line display data to the touch panel 40a and liquid crystal display panel 40b, respectively. Thus, the dotted line BL is displayed at a position on the liquid crystal display panel 40b corresponding to the selection images I on the menu display screen, and the region encompassed by the dotted line BL is enabled as an operable region.

The display control ROM 102 stores, in addition to system programs, various types of image data to be output to the display panel 30, dotted line display data to be output to the liquid crystal display panel 40b, operable region specifying data for specifying an operable region on the touch panel 40a, and so forth. The operable region specifying data is stored in the form of coordinates data for each operable region, such as X coordinates (xa, xb) and Y coordinates (ya, yb), for example.

The display control ROM 102 stores, for example, various types of image data to be displayed on the display panel 30. This image data is stored in a hierarchical manner, and includes "menu screen display data" (see FIG. 3) output in a case where a menu screen display signal has been input from the menu screen display switch 5b, "NAVI MENU display data" (see FIG. 5) output when "NAVI" has been selected from the menu display screen, and so forth. The display control ROM 102 also stores various types of determination data. The determination data includes steering angle determination data (−3 degrees≤steering angle θ≤+3 degrees) used to determine whether or not the steering wheel 4 is within the predetermined range, determination data used to determine whether or not the automobile 1 has transitioned from a stopped state to a traveling state, determination data used to determine whether or not the automobile 1 has transitioned from a traveling state to a stopped state, and so forth.

The display control RAM 103 temporarily stores programs to be executed by the display control CPU 101, results of computations performed by the display control CPU 101, and so forth.

The receiver 9 receives data from Global Positioning System (GPS) satellites (omitted from illustration), based on which position information is calculated. Control processing which is performed using data received from GPS satellites is known art, so details will be omitted. Stated simply, the display control CPU 101 effects control so as to calculate position information based on data received from GPS satellites, and to display the current vehicle position and map information of the surroundings on the display panel 30 (see FIG. 6).

Thus, according to the present implementation, the touch panel 40a is situated on the line-of-sight direction EL of the driver H viewing the display panel 30, and thus is configured such that the driver H can operate the touch panel 40a while viewing the image displayed on the display panel 30. That is to say, the driver H does not have to move his/her line of sight to operate the touch panel 40a, so ease of visual recognition is improved. Also, the touch panel 40a according to the present implementation is attached to the steering wheel 4 which the driver H is holding to drive the automobile 1, enabling improvement in operability of the touch panel 40a.

Moreover, the present implementation is configured such that the display panel 30 is attached to the instrument panel 3 situated to the front of the driver's seat 2, and the driver H views images displayed on the display panel 30 through the touch panel 40a attached to the steering wheel 4. Thus, when the automobile 1 is in motion, the driver H can view both the outside ahead of the vehicle, and the display panel 30 and touch panel 40a, with little movement of the line-of-sight direction EL. Accordingly, the display device 20 according to the present implementation enables not only operability and ease of visual recognition, but also safety to be improved.

While the input panel 40 according to the present implementation has been described as being attached to the steering wheel 4, other arrangements may be made. For example, the input panel 40 may be attached to any one of an A pillar 50 (see FIG. 1) of the automobile 1, a roof member such as a roof panel (omitted from illustration) of the automobile 1, and interior member 51 (see FIG. 1) covering the A pillar 50 and roof member from the inside of the cabin, as long as situated along the line-of-sight direction EL of the driver operating the input panel 40 so that the input panel 40 is situated in front of and overlaying the display panel 30. In this case, the input panel 40 is preferably positioned so as to be reachable by those seated (including the passenger seat and so forth besides the driver's seat 2). Note that the A pillar 50, a roof panel, and interior member 51 correspond to "pillar member", "roof member", and "interior member" herein.

Also, the input panel 40 according to the present implementation has been described as being fixed to the steering wheel 4. However, the input panel 40 may be turnably attached to the steering wheel 4 by way of hinge members or the like. Further, the display panel 30 according to the present implementation has been described as being attached to the instrument panel 3. However, the display panel 30 may be attached to, for example, any one of the windshield 53, the A pillar 50 (see FIG. 1) of the automobile 1, a roof member such as a roof panel (omitted from illustration) of the automobile 1, and interior member 51 (omitted from illustration) covering the A pillar 50 and roof member from the inside of the cabin, as long as situated along the line-of-sight direction EL of the driver H operating the input panel 40 so that the input panel 40 is situated in front of and overlaying the display panel 30. The display panel 30 disposed such may be turnably attached by way of hinge members or the like.

Also, the present implementation has been described as the input-panel-side operating unit 6 being operated to match the displayed selection images I on the display panel 30 and the operable region on the touch panel 40a. However, the present invention is not restricted to this, and a configuration may be made where, for example, a detection sensor which detects the direction of line of sight of the passenger is provided, so as to automatically match displayed selection images I on the display panel 30 and the operable region on the touch panel 40a when the detection sensor detects motion of the line of sight.

Moreover, while the present implementation has been described with the display device 20 provided to an automobile 1, the display device 20 may be provided any sort of vehicle, including trains and airplanes, for example.

Second Implementation

The first implementation has been described as the display panel 30 being provided further toward the front of the automobile from the input panel 40. However, a display panel may be situated toward the rear of the automobile from an input panel, as long as the input panel 40 is situated on the line-of-sight direction EL of the passenger viewing the display panel 30.

Figure 7:
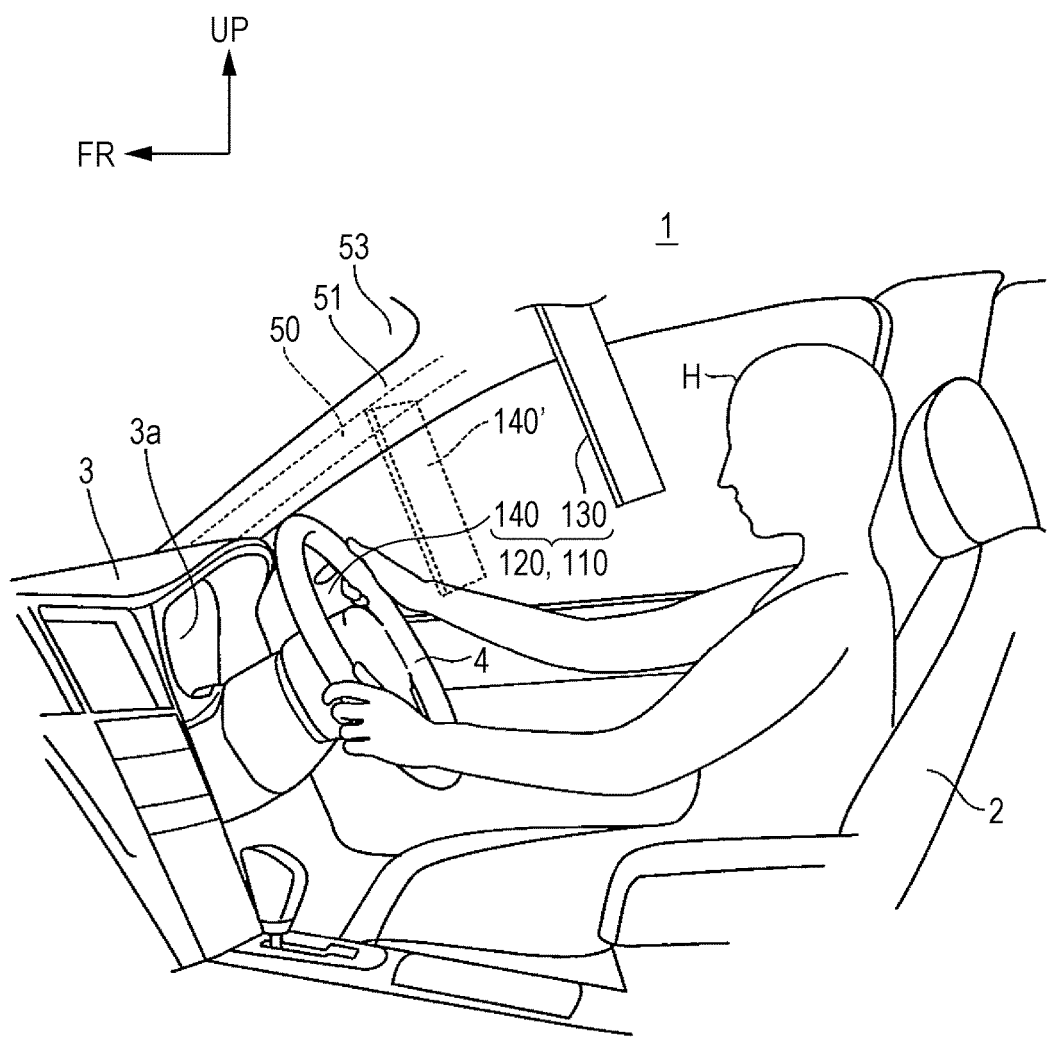
FIG. 7 is a perspective view illustrating inside of a cabin of a vehicle, according to a second implementation of the present invention.
Figure 8:
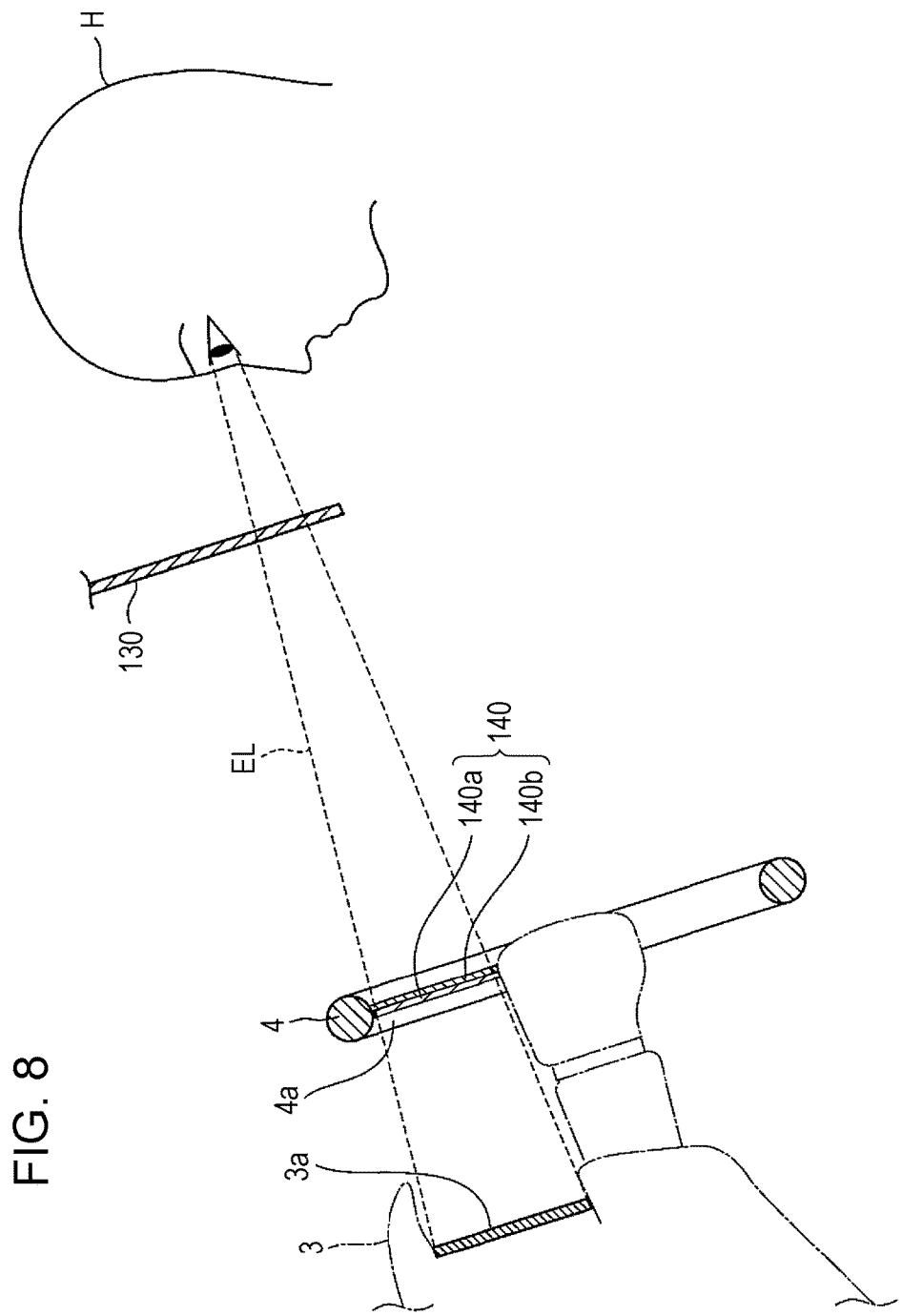
FIG. 8 is a side view illustrating the positional relation between driver, display panel, and input panel.
Figure 9:
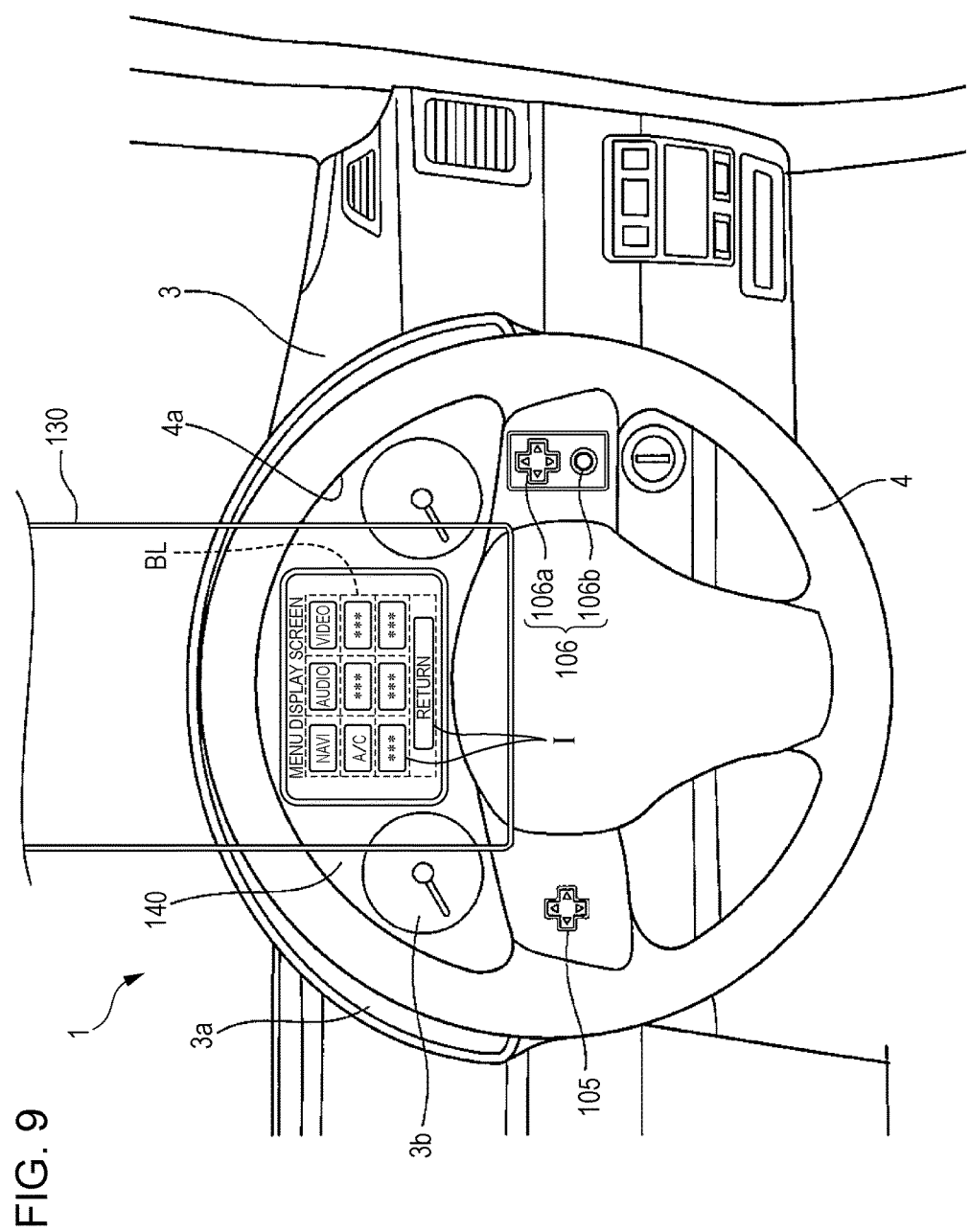
FIG. 9 is a front view illustrating the display panel and input panel as viewed from the driver's seat.
Figure 10:
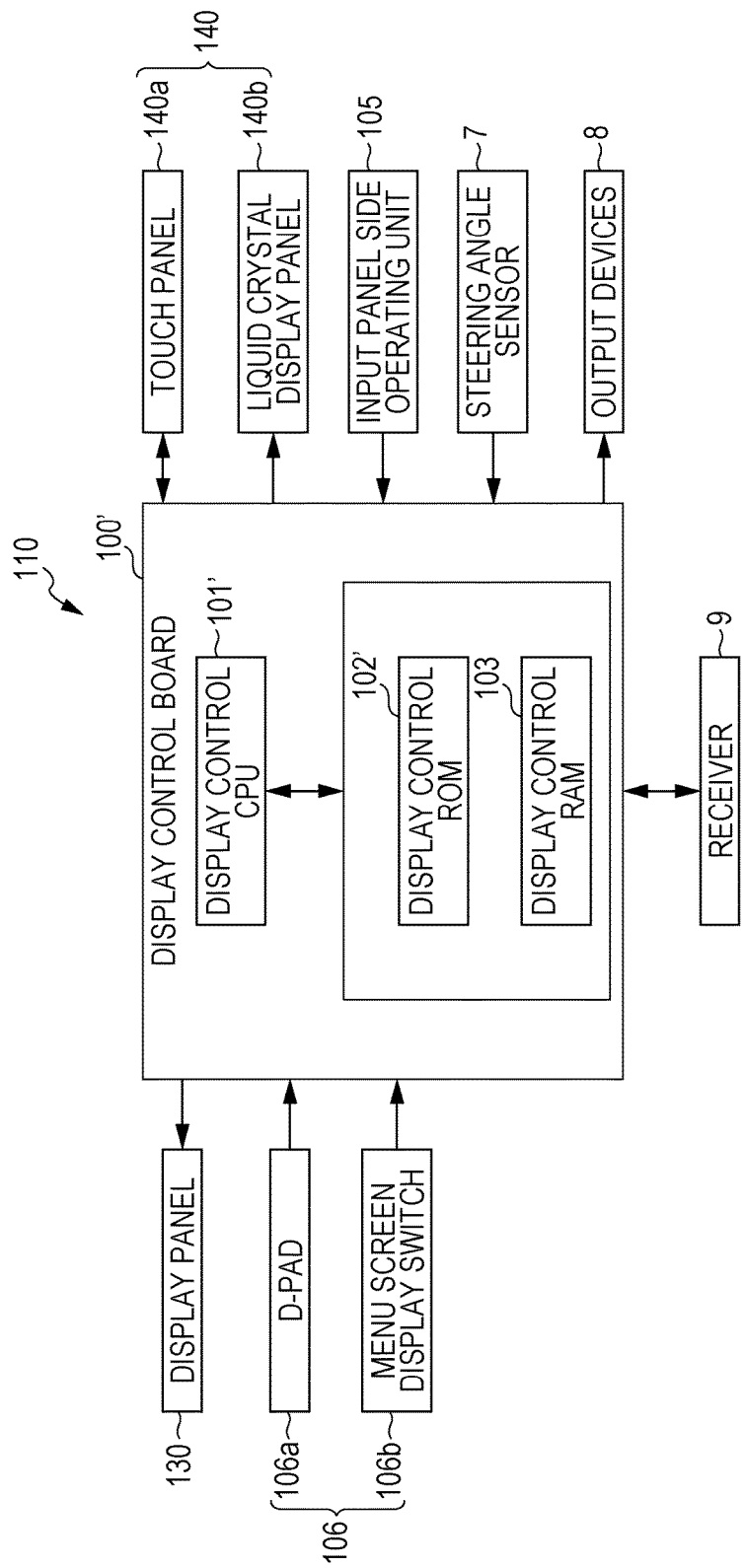
FIG. 10 is a block diagram for describing a control system provided to an automotive information display system.
Figure 11:
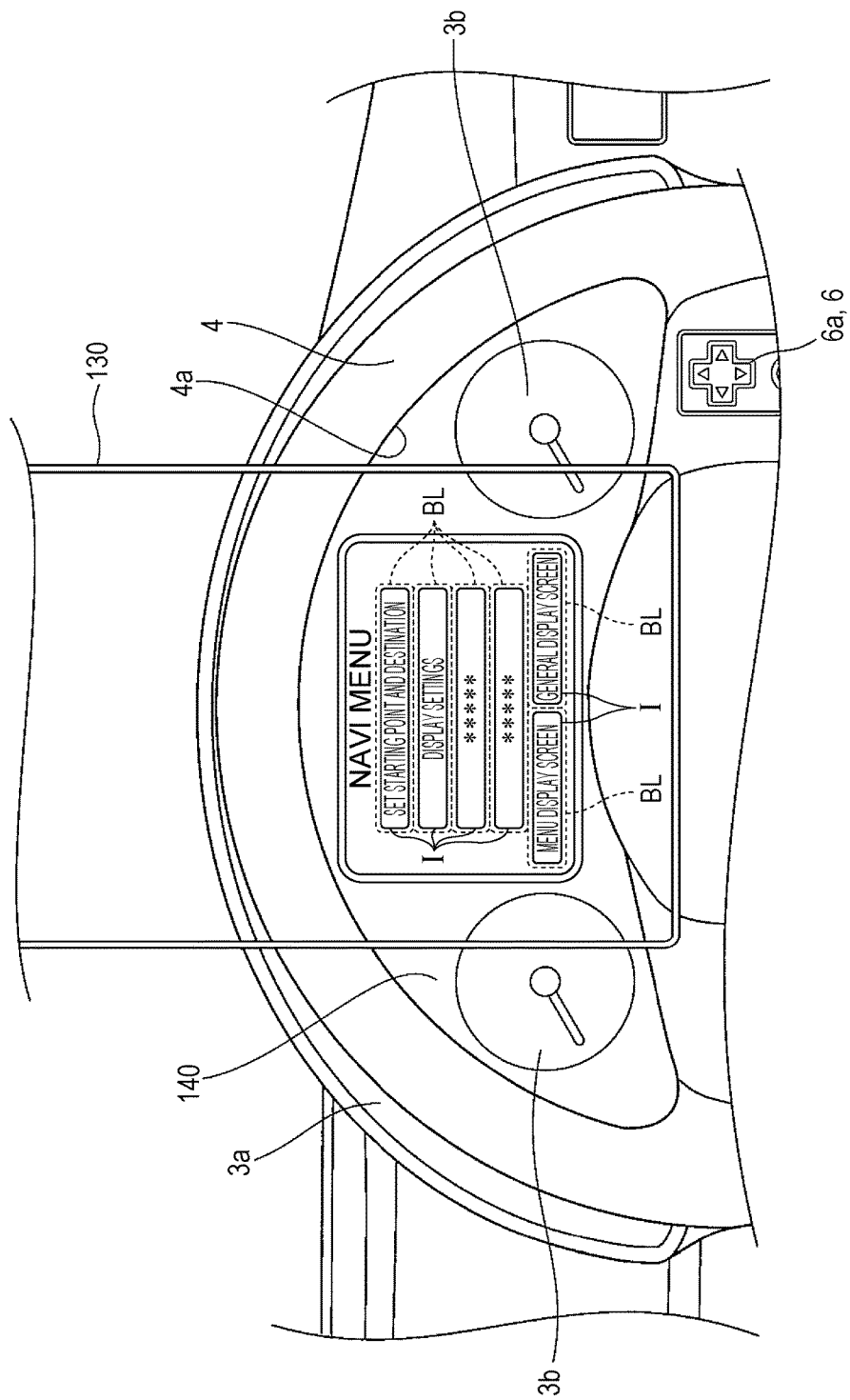
FIG. 11 is a diagram describing a "navigation menu screen", as an example of an image displayed on the display panel.

The following is description of a case in which the display panel is situated toward the rear of the automobile from the input panel, with reference to FIGS. 7 through 11. FIG. 7 is a perspective view illustrating inside of a cabin of a vehicle, according to a second implementation of the present invention, FIG. 8 is a side view illustrating the positional relation between driver, display panel, and input panel, FIG. 9 is a front view illustrating the display panel and input panel as viewed from the driver's seat, FIG. 10 is a block diagram for describing a control system provided to an automotive information display system, and FIG. 11 is a diagram describing a "navigation menu screen", as an example of an image displayed on the display panel. Note that in the following description, configurations the same as those in the first implementation described above are denoted with the same reference numerals, and description thereof will be omitted.

An automotive information display system 110 according to the present implementation includes a display device 120, as illustrated in FIG. 7. The display device 120 is installed in the cabin of an automobile 1 or like vehicle, and includes a display panel 130 and input panel 140. Note that the display device 120 and display panel 130 correspond to "display device for a vehicle" and "display unit" according to an aspect of the invention.

The display panel 130 is a so-called transmissive liquid crystal panel, and is attached to a roof panel (omitted from illustration) or the interior member 51 covering the roof panel, by way of a hinge or the like, as illustrated in FIGS. 7 through 9. The display panel 130 can be moved between a usage position situated in front of the eyes of the driver H, and a stored position generally parallel to the ceiling face, by being operated by the driver H.

In a state where in the display panel 130 has been moved to the usage position, the driver H can view the input panel 140, the meter panel 3a, and the outside ahead of the automobile, through the display panel 130. This display panel 130 is of the same configuration as the display panel 30 according to the first implementation, so description of images and so forth displayed on the display panel 130 will be omitted.

As illustrated in FIG. 9, an display-panel-side operating unit 106 is provided at a predetermined position (right side) of the steering wheel 4. The display-panel-side operating unit 106 includes a D-pad 106a, and a menu screen display switch 106b provided to the lower side of the D-pad 106a. The D-pad 106a has an upper end, a lower end, a left end, and a right end, so that pressing one of these ends enables the display position of the entire image displayed on the display panel 130 to be moved.

The menu screen display switch 106b is a pressing switch similar to the menu screen display switch 5b according to the first implementation described above. Pressing the menu screen display switch 106b displays a "menu display screen" such as illustrated in FIG. 9 on the display panel 130. Images displayed in the "menu display screen" are the same as with the first implementation, so description thereof will be omitted.

Next, the input panel 140 will be described with reference to FIGS. 8 and 9. As illustrated in FIGS. 8 and 9, the input panel 140 includes a touch panel 140a capable of receiving operation input by bringing a finger or the like into contact or into close proximity, and a liquid crystal display panel 140b which is layered on the side of the touch panel 140a closer to the front of the automobile. The touch panel 140a and liquid crystal display panel 140b are both formed of a transparent material. Known arrangements may be used for each. The touch panel 140a above corresponds to the "operating unit" according to an aspect of the invention.

The input panel 140 has generally the same shape as the upper space 4a of the steering wheel 4, and is fixed to the opening perimeter of the upper space 4a. That is to say, in the present implementation, the driver H can view the meter panel 3a through the display panel 130 and the input panel 140.

A dotted line BL is displayed on the liquid crystal display panel 140b, so the deriver H can recognize the area of the touch panel 140a which is operable (hereinafter referred to as "operable region"). The dotted line BL is displayed in a size slightly larger than the size of the selection images I displayed on the display panel 130. Also, the dotted line BL displayed on the operable region of the touch panel 140a and the liquid crystal display panel 140b is changed in accordance (coordination) with the displayed image displayed on the display panel 130.

For example, in a case where the driver H touches the operable region of the touch panel 140a corresponding to the selection image I for "NAVI" (see FIG. 9), and a "NAVI MENU screen" is displayed on the display panel 130, the liquid crystal display panel 140b displays the dotted line BL at the position corresponding to the selection images I displayed in the "NAVI MENU screen" (e.g., selection image I for "SET STARTING POINT AND DESTINATION"), as illustrated in FIG. 11. The driver H can select a selection image I displayed in the "NAVI MENU screen" (e.g., selection image I for "SET STARTING POINT AND DESTINATION") by touching a region encompassed by the dotted line BL by way of the touch panel 140a.

The dotted line BL displayed on the liquid crystal display panel 140b (and the selectable region of the touch panel 140a) can be moved by operating a input-panel-side operating unit 105 provided at a predetermined position (left side) on the steering wheel 4, as illustrated in FIG. 9. The input-panel-side operating unit 105 is a D-pad switch the same as the D-pad 106a, and has an upper end, a lower end, a left end, and a right end, so that pressing one of these ends enables the dotted line BL displayed on the liquid crystal display panel 140b (selectable region on the touch panel 140a) to be moved.

The driver H can situate the region encompassed by the dotted line BL (liquid crystal display panel 40b) so as to surround the selection images I (display panel 130) in the line-of-sight direction EL of the driver H viewing the display panel 130 (see FIG. 9), by operating the display-panel-side operating unit 5. The driver H can adjust the position in this way, and then select the selection image I corresponding to this region by performing touching or the like of the region surrounded by the dotted line BL. This positional adjustment may also be performed by moving the steering wheel 4 vertically, or by operating the D-pad 106a of the display-panel-side operating unit 106, besides operating the input-panel-side operating unit 105. While the present implementation is configured such that the dotted line BL is moved by operating the input-panel-side operating unit 105, a configuration may be where the dotted line BL is moved by operation input at the touch panel 140a (e.g., a flicking operation), for example. Also, an arrangement may be made wherein the position of the dotted line BL is adjusted as described above, and thereafter the dotted line BL is not displayed on the liquid crystal display panel 140b.

Next, the control system provided in the automotive information display system 110 will be described with reference to FIG. 10. As illustrated in FIG. 10, the control system primarily includes a display control board 100', the display panel 130, the input panel 140 (touch panel 140a and liquid crystal display panel 140b), the input-panel-side operating unit 105, the display-panel-side operating unit 106 (D-pad 106a and menu screen display switch 106b), the steering angle sensor 7, various types of output devices 8, and the receiver 9, which are connected by wiring cables.

The display control board 100' is provided in the display panel 130 or the like, and has a display control CPU 101', a display control ROM 102', and a display control RAM 103. The display control CPU 101' reads in system programs and the like stored in the display control ROM 102' beforehand, outputs image data to the display panel 130 and liquid crystal display panel 140b based on the information input from the touch panel 140a and so forth, and also outputs operable region specifying data to the touch panel 140a.

The display control ROM 102' stores, in addition to system programs, various types of image data to be output to the display panel 130, dotted line display data to be output to the liquid crystal display panel 140b, operable region specifying data for specifying an operable region on the touch panel 140a, and so forth. The operable region specifying data is stored in the form of coordinates data for each operable region, such as X coordinates (xa, xb) and Y coordinates (ya, yb), for example.

The display control ROM 102' stores, for example, various types of image data to be displayed on the display panel 130. This image data is stored in a hierarchical manner, and includes "menu screen display data" (see FIG. 9) output in a case where a menu screen display signal has been input from the menu screen display switch 106b, "NAVI MENU display data" (omitted from illustration) output when "NAVI" has been selected from the menu display screen, and so forth.

Thus, according to the present implementation, the touch panel 140a is situated on the line-of-sight direction EL of the driver H viewing the display panel 130, and thus is configured such that the driver H can operate the touch panel 140a while viewing the image displayed on the display panel 130. That is to say, the driver H does not have to move his/her line of sight to operate the touch panel 140a, so ease of visual recognition is improved. Also, the touch panel 140a according to the present implementation is attached at a position reachable by the driver H (the steering wheel 4), enabling improvement in operability of the touch panel 140a.

Moreover, the present implementation is configured such that the display panel 130 is situated in front of the eyes of the driver seated in the driver's seat 2, and the driver H views the touch panel 140a attached to the steering wheel 4 through the display panel 130. Thus, when the automobile 1 is in motion, the driver H can view both the outside ahead of the vehicle, and the display panel 130 and touch panel 140a, with little movement of the line-of-sight direction EL. Accordingly, the display device 120 according to the present implementation enables not only operability and ease of visual recognition, but also safety to be improved.

While the input panel 140 according to the present implementation has been described as being attached to the steering wheel 4, other arrangements may be made. For example, the input panel 140 may be attached to either one of the A pillar 50 (see FIG. 7) of the automobile 1, and a roof member such as a roof panel (omitted from illustration) of the automobile 1, as long as situated along the line-of-sight direction EL of the driver operating the input panel 140 so that the input panel 140 further toward the front of the automobile 1 from the display panel 130 so as to be overlaid by the display panel 130. Further, the input panel 140 may be attached to the interior member 51 (see FIG. 7) covering the A pillar 50 and roof member from the inside of the cabin (e.g., as indicated by reference numeral 40' in FIG. 7). In this case, the input panel 140 is preferably positioned so as to be reachable by those seated (including the passenger seat and so forth besides the driver's seat 2). Note that the A pillar 50, a roof member, and interior member 51 correspond to "pillar member", "roof member", and "interior member" herein.

Also, the display panel 130 according to the present implementation has been described as being attached to the roof panel (omitted from illustration) of the automobile 1 or interior member 51 covering the roof panel. However, the display panel 130 may be attached to, for example, any one of the A pillar 50 (see FIG. 7) of the automobile 1, and the interior member 51 (see FIG. 1) covering the A pillar 50 from the inside of the cabin, as long as situated along the line-of-sight direction EL of the driver H operating the input panel 140 so that the display panel 130 is situated further toward the rear of the automobile from the input panel 140 so as to overlay the input panel 140. Alternatively, the input panel 140 may be an input panel using a head mounted display (HMD) or projection to eyeglasses.

Also, the present implementation has been described as the input-panel-side operating unit 106 or the like being operated to match the displayed selection images I on the display panel 130 and the operable region on the touch panel 140a. However, the present invention is not restricted to this, and a configuration may be made where, in the same way as with the modification of the first implementation, a detection sensor which detects the direction of line of sight of the passenger is provided, so as to automatically match displayed selection images I on the display panel 130 and the operable region on the touch panel 140a when the detection sensor detects motion of the line of sight.

Moreover, while the present implementation has been described with the display device 120 provided to an automobile 1, the display device 120 may be provided any sort of vehicle, including trains and airplanes, for example.

Third Implementation

The above implementation s (first implementation and second implementation) have been described as the input panel (input panel 40 and input panel 140) having been disposed on the steering wheel 4. However, the present invention is not restricted to this, and may be situated between the instrument panel 3 and the steering wheel 4.

Figure 12:
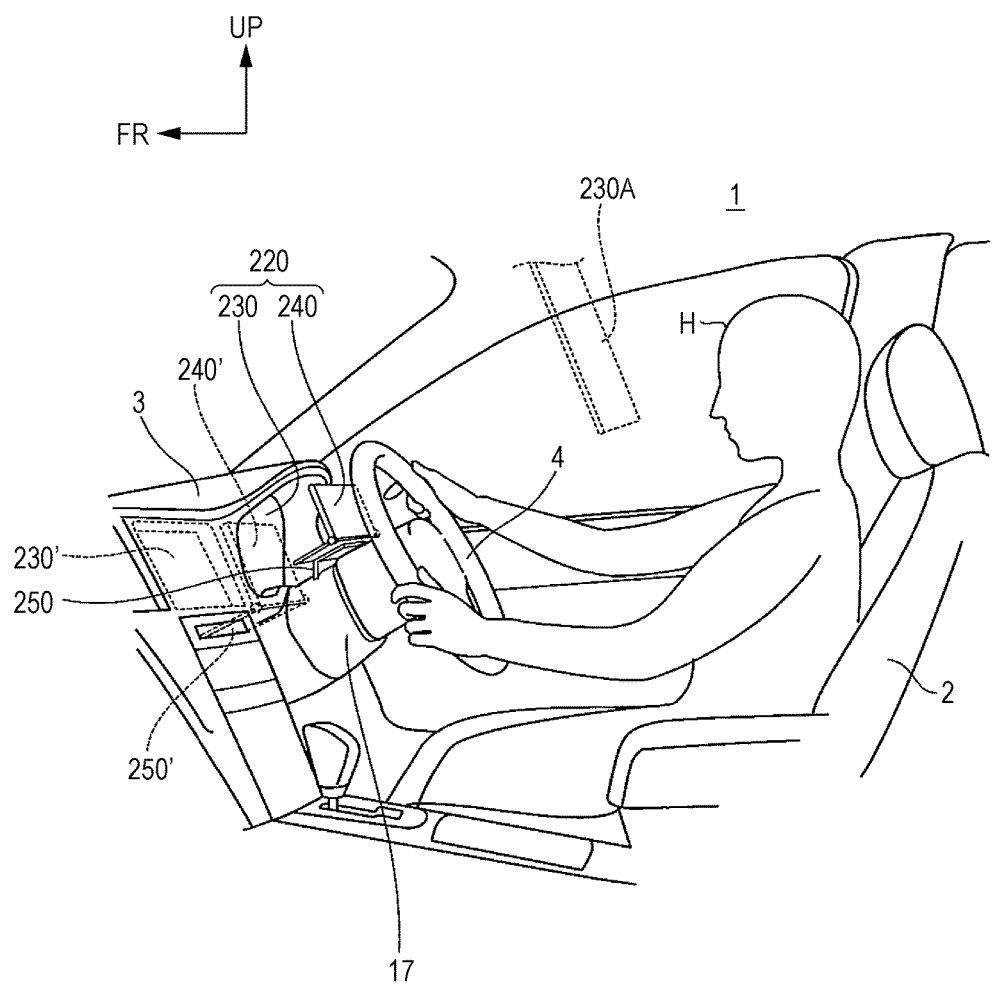
FIG. 12 is a perspective view illustrating inside of a cabin of a vehicle, according to a third implementation of the present invention.
Figure 13:
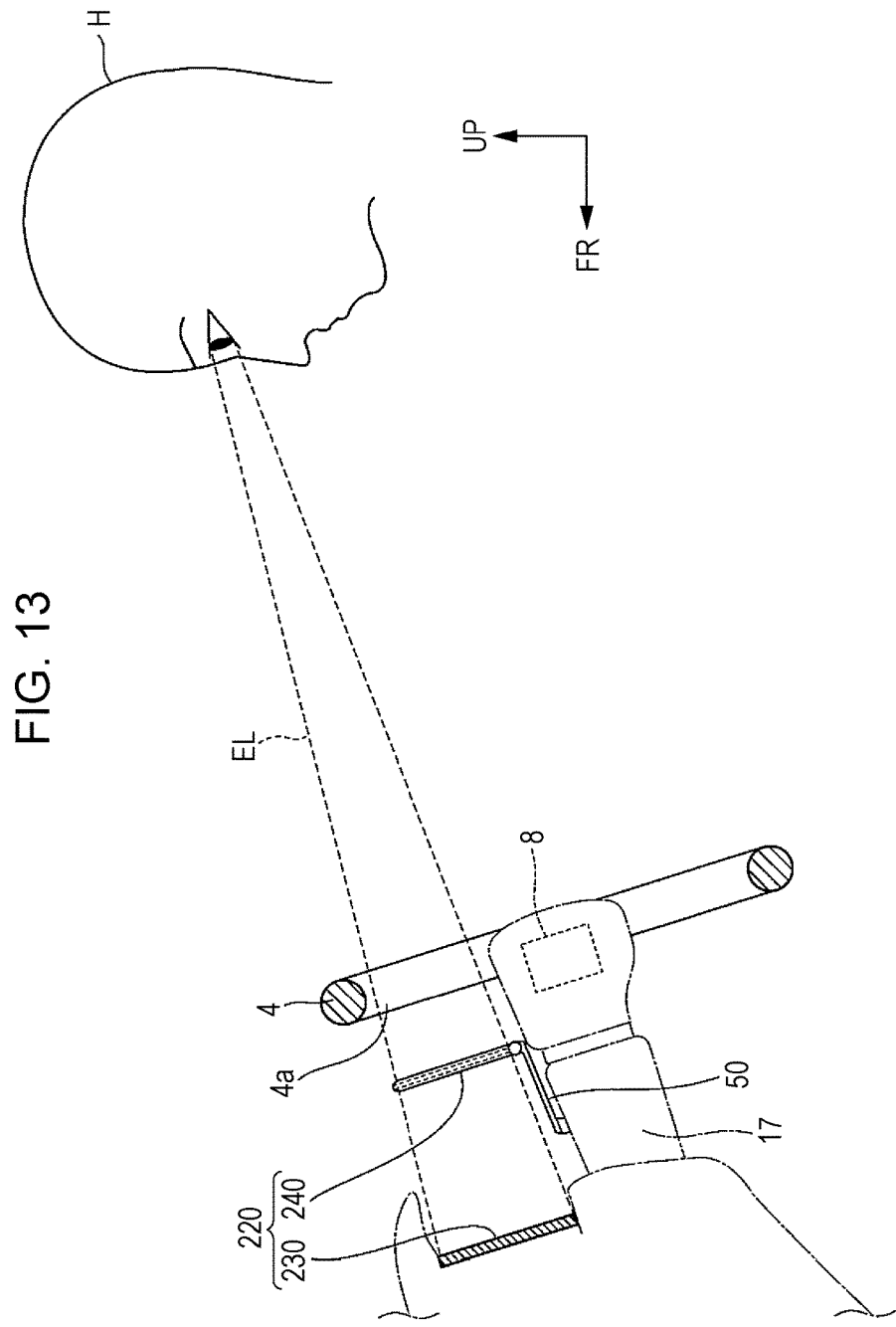
FIG. 13 is a side view illustrating the positional relation between driver, display panel, and input panel.
Figure 14:
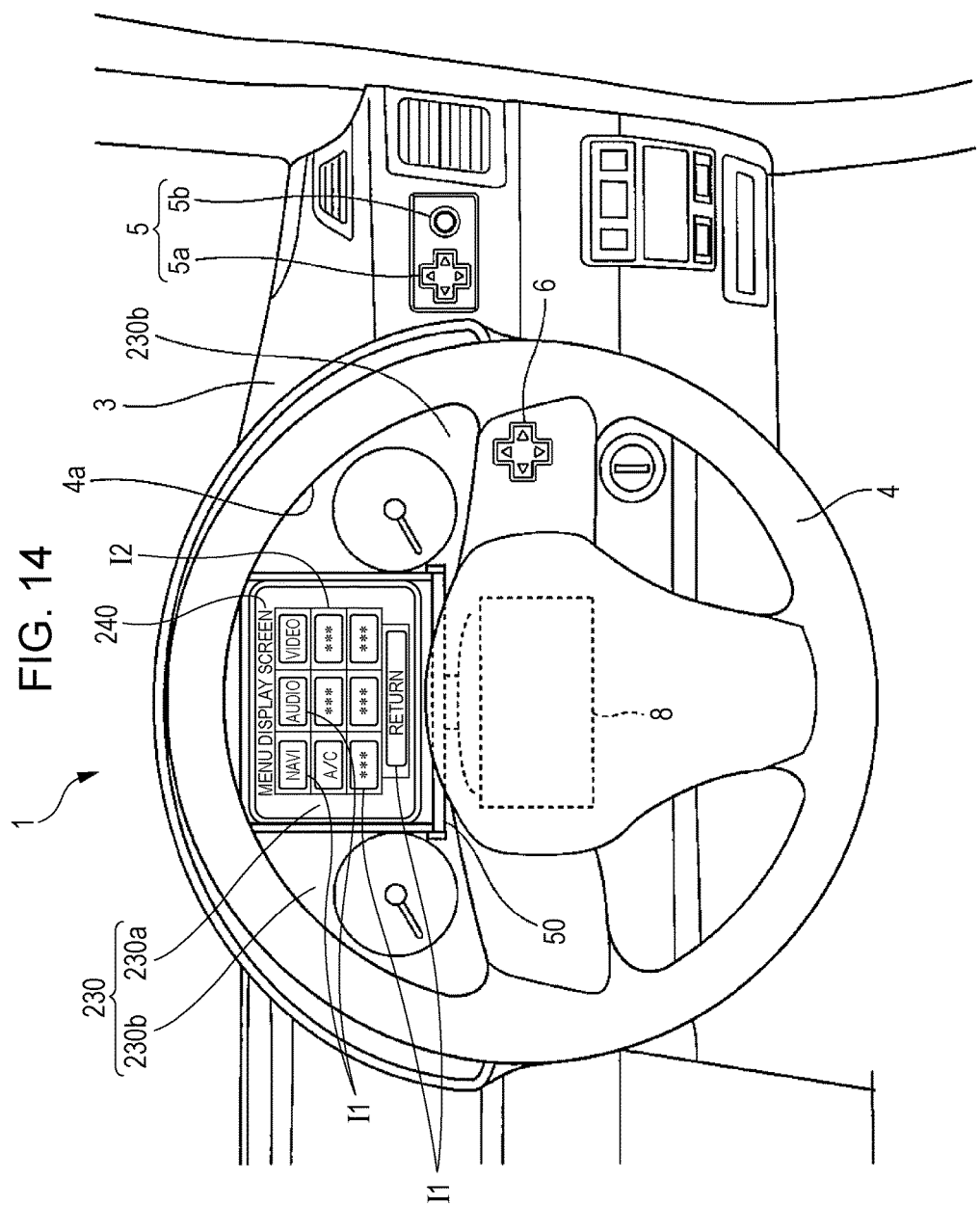
FIG. 14 is a front view illustrating the display panel and input panel as viewed from the driver's seat.
Figure 15:
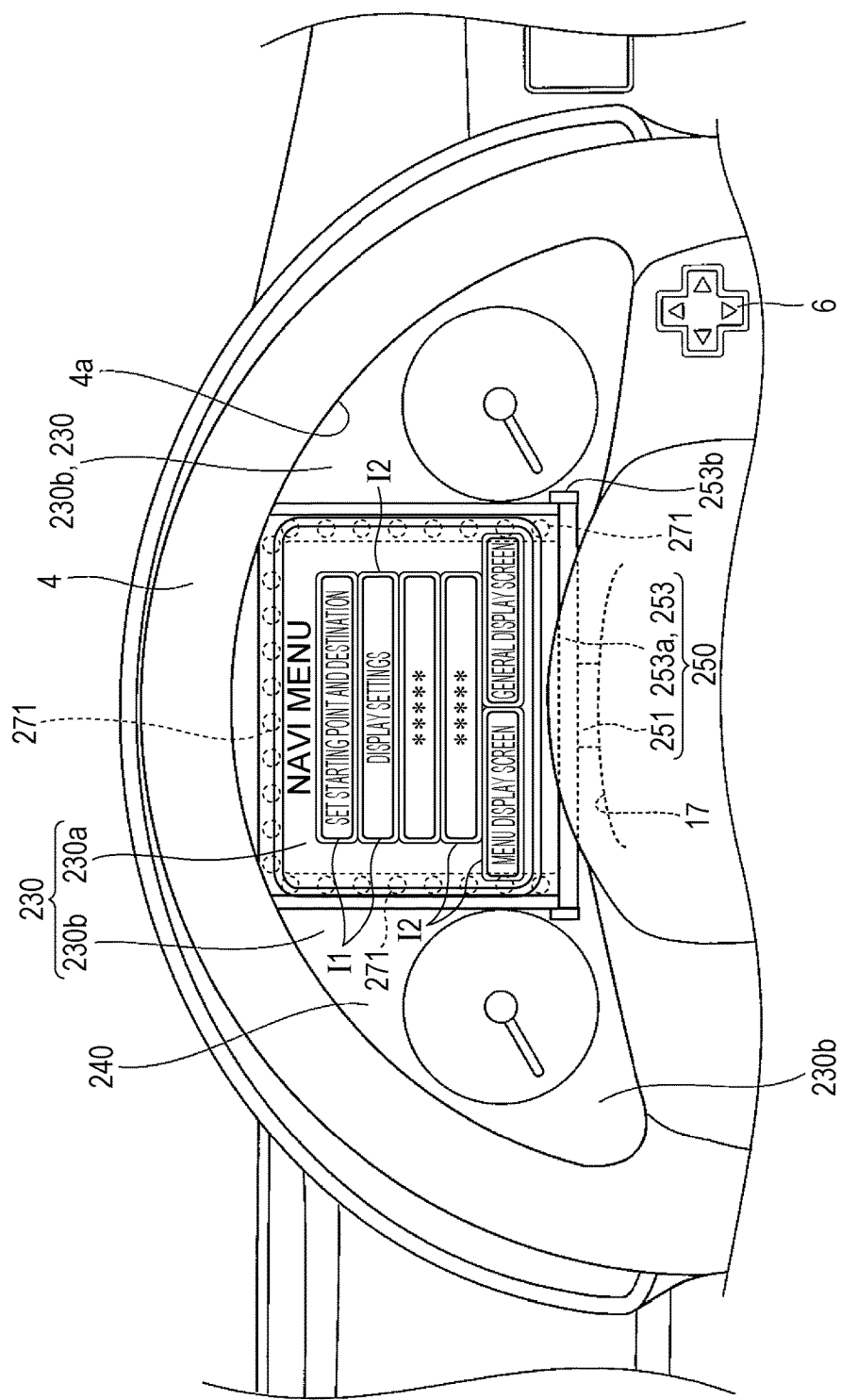
FIG. 15 is a diagram describing a "navigation menu screen", as an example of an image displayed on the display panel.
Figure 16:
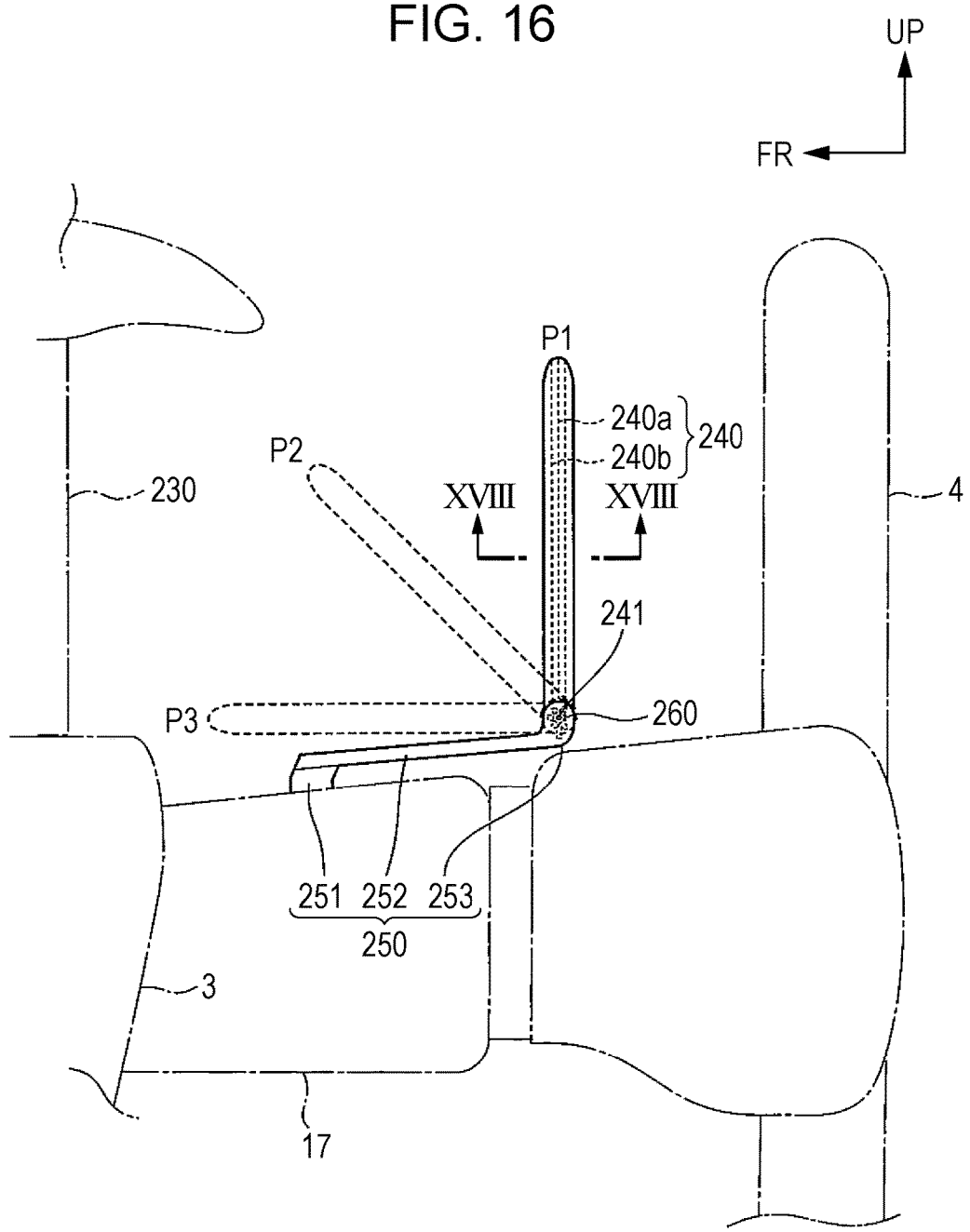
FIG. 16 is a side view of the input panel.
Figure 17:
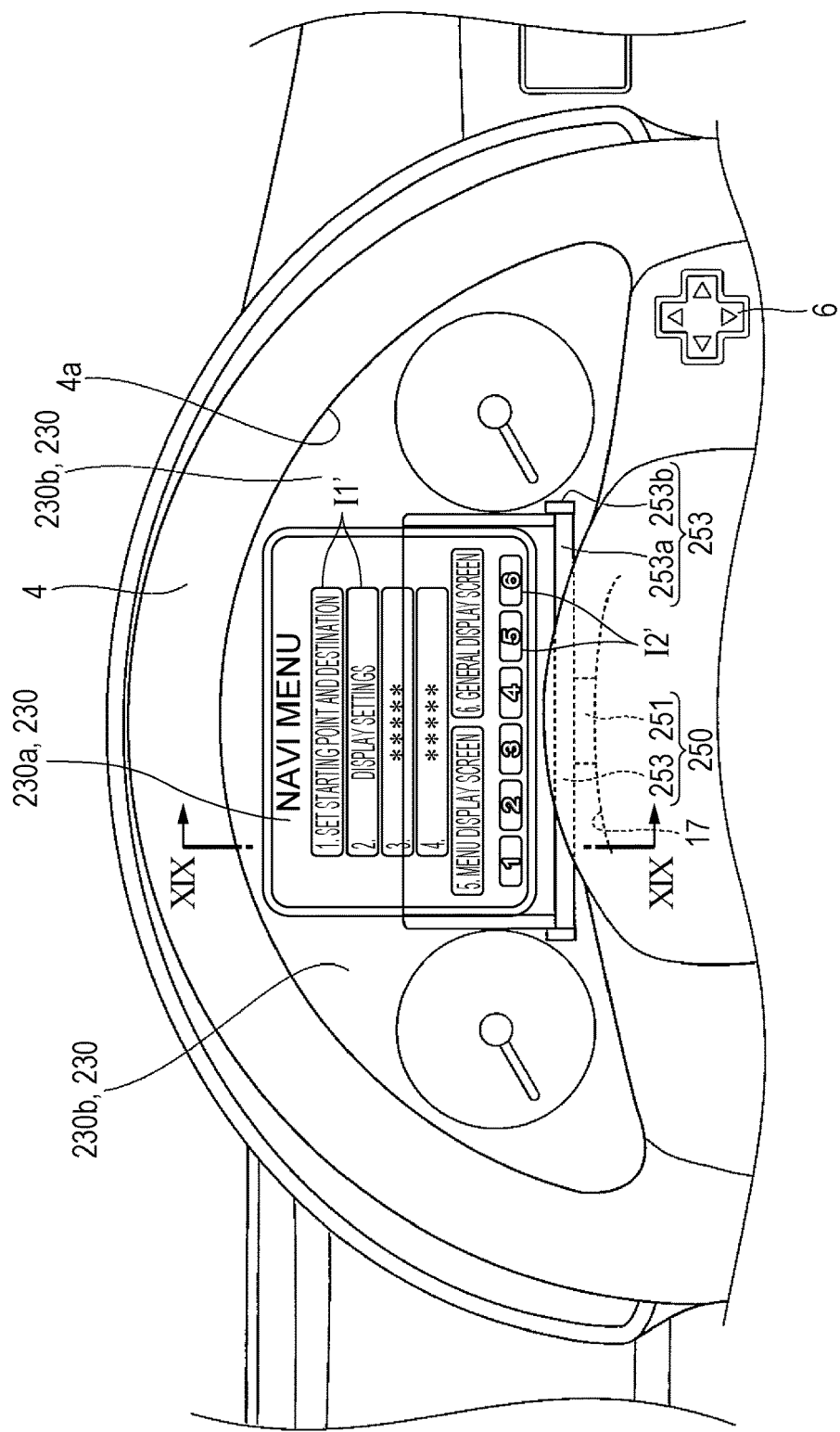
FIG. 17 is a front view of the display panel and input panel from the driver's seat, with the input panel tilted down.
Figure 18:
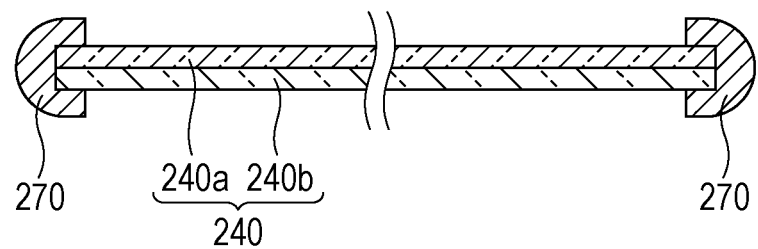
FIG. 18 is a cross-sectional view taken along XVIII-XVIII in FIG. 16.
Figure 19:
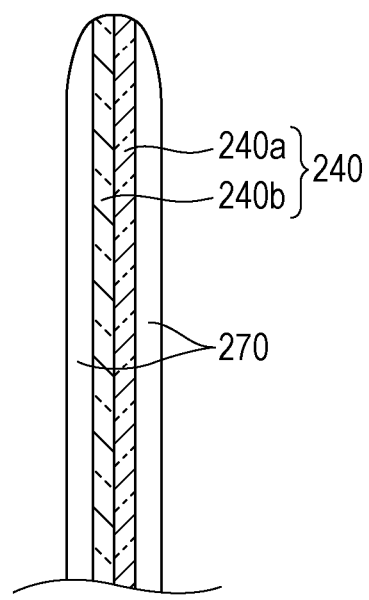
FIG. 19 is a cross-sectional view taken along XIX-XIX in FIG. 17.
Figure 20A:
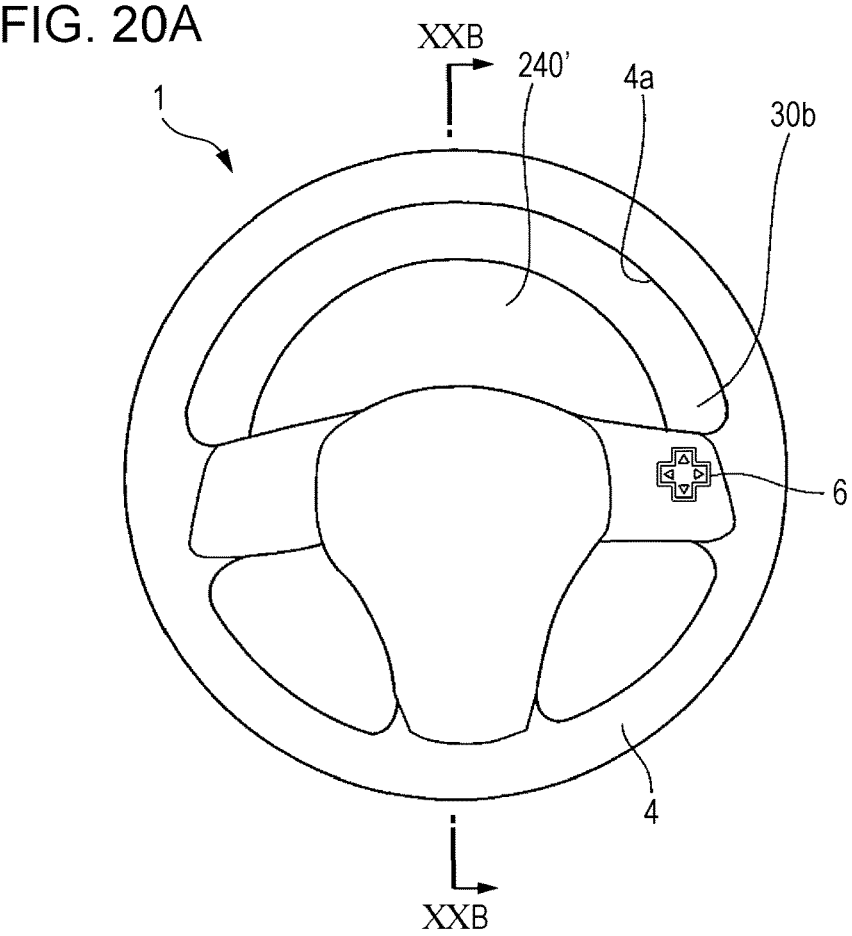
Figure 20B:
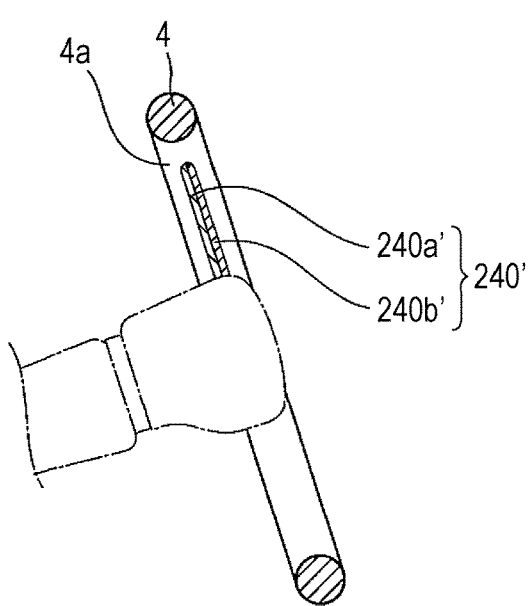

Hereinafter, a case where the input panel is situated between the instrument panel 3 and the steering wheel 4 will be described with reference to FIGS. 1, 4, and 12 through 20B. FIG. 12 is a perspective view illustrating inside of a cabin of a vehicle, according to the third implementation of the present invention, FIG. 13 is a side view illustrating the positional relation between driver, display panel, and input panel, FIG. 14 is a front view illustrating the display panel and input panel as viewed from the driver's seat, and FIG. 15 is a diagram describing a "navigation menu screen", as an example of an image displayed on the display panel. FIG. 16 is a side view of the input panel, FIG. 17 is a front view of the display panel and input panel from the driver's seat, with the input panel tilted down, FIG. 18 is a cross-sectional view taken along XVIII-XVIII in FIG. 16, FIG. 19 is a cross-sectional view taken along XIX-XIX in FIG. 17, and FIGS. 20A and 20B are diagrams illustrating a modification of providing the input panel to the steering wheel, in which FIG. 20A is a frontal view, and FIG. 20B is a cross-sectional view taken along XXB-XXB in FIG. 20A. Note that in the following description, configurations the same as those in the implementation s described above are denoted with the same reference numerals, and description thereof will be omitted.

An automotive information display system 220 according to the present implementation is installed in the cabin of the automobile 1, and includes a display panel 230 and an input panel 240, as illustrated in FIGS. 1, 12 and 13. The display panel 230 and input panel 240 are each separated by a distance in the front-to-back direction of the automobile. Note that the display device 220 and display panel 230 correspond to "display device for a vehicle" and "display unit" in the Summary of the Invention.

The steering wheel 4 provided to the automobile 1 rotatably attached to a steering column 17 by way of a steering shaft (omitted from illustration). The steering wheel 4 and steering column 17 are configured so as to be capable of moving vertically by operating a tilt lever (omitted from illustration).

As illustrated in FIGS. 13 and 14, the display panel 230 is a display device such as a liquid crystal display device, in the same way as with the display panel 230 in the first implementation described above. The display panel 30 is attached to the instrument panel 3 which is toward the front side of the automobile from the driver's seat 2. The driver H can see images displayed on the display screen of the display panel 230 through the upper space 4a of the steering wheel 4.

The display panel 230 can be switched to display various types of images, including images display common automobile information such as traveling speed of the automobile 1 (speedometer) and revolutions of the engine per unit time (tachometer), and also navigation images displaying map information images, and so forth, in the same way as with the display panel 30 according to the first implementation.

In the same way as with the first implementation described above, various types of images displayed on the display panel 230 can be moved by pressing the D-pad 5a with the present implementation as well, and a "menu display screen" such as illustrated in FIG. 14 can be displayed on the display panel 230 by pressing the menu screen display switch 5b.

The driver H can select, of the operation regions on a later-described touch panel 240a (see FIG. 15), a region corresponding to a desired selection image I1, and thus cause the display panel 230 to display an initial image corresponding to the function of the selected selection image I1, which will be described in detail later. The touch panel 240a above corresponds to the "operating unit" in the Summary of the Invention.

Next, the input panel 240 will be described with reference to FIGS. 13, 14, and 15 through 19. As illustrated in FIGS. 13, 14, and 16, the input panel 240 includes a touch panel 240a capable of receiving operation input by bringing a finger or the like into contact with or into close proximity with the operating surface, and a liquid crystal display panel 240b which is layered on the side of the touch panel 240a closer to the front of the automobile. The touch panel 240a and liquid crystal display panel 240b are both formed of a transparent material, and known arrangements may be used for each.

The input panel 240 (touch panel 240a and liquid crystal display panel 240b) are formed as rectangular plates in form, a pair of turning shafts 241 which protrude in opposite directions are provided to the lower left and right ends thereof, as illustrated in FIGS. 15 through 17. The pair of turning shafts 241 is borne by a latter-described supporting member 250, whereby the input panel 240 is attached to the steering column 17 so as to be capable of an erect position P1 erected upwards, and a folded-down position P3 folded down toward the front of the automobile.

The driver H can view the display region 230a of the display panel 230 through the upper space 4a of the steering wheel 4 and the input panel 240, in a state where the input panel 240 is placed in the erect position P1. Note that the input panel 240 may be formed of a semi-transparent material instead of a transparent material. However, as much transparency as possible is desirable, taking into consideration ease of visual recognition of the image displayed on the display panel 230.

Next, the supporting member 250 to which the input panel 240 is attached will be described with reference to FIGS. 16 and 17. As illustrated in FIGS. 16 and 17, the supporting member 250 is formed of resin or the like, and includes a steering column attachment 251, an extension 252 having a rectangular cross-section shape, and an input panel receptacle 253 linked to the part of the extension 252 toward the rear of the automobile. The steering column attachment 251, extension 252, and input panel receptacle 253 correspond to "vehicle-mounted part attaching unit", "extension", and "operating unit attaching unit" herein.

The steering column attachment 251 is formed as a rectangular plate, and is fixed to a predetermined position on the steering column 17 by screws or the like. The extension 252 is extended from a predetermined position on the steering column attachment 251 toward the rear of the automobile.

The input panel receptacle 253 includes an input panel cover 253a and a pair of turning axis supports 253b. The input panel cover 253a extends in the left-and-right direction with the supporting member 250 fixed to the steering column 17, and the middle portion thereof in the left-and-right direction is linked to an end of the extension 252 toward the rear of the automobile. The input panel cover 253a is configured so as to support the lower edge (lower end) of the input panel 240 from below, as well as to cover. The perimeter of the input panel cover 253a toward the rear of the automobile is formed having an arc-shaped cross-sectional form.

Forming the input panel cover 253a with this sort of arc-shaped cross-sectional form suppresses injury to the hand, fingers, etc., for the driver H if coming into contact with the input panel cover 253a when operating the touch panel 240a. Also, the member which suppresses injury to the hand, fingers, etc., of the driver H (input panel cover 253a), is also used as the member to support the input panel 240, thus enabling reduction in the number of parts.

The pair of turning axis supports 253b are provided so as to each protrude upwards from the left and right ends of the input panel cover 253a in a state where the supporting member 250 is fixed to the steering column 17. The pair of turning axis support 253b respectively turnably supports the pair of turning shafts 241 provided to the input panel 240. The input panel 240 is enabled to move between the erect position P1 and the folded-down position P3 by the turning shafts 241 being borne by the turning axis supports 253b.

Further, a stopper mechanism 260 which can stop the input panel 240 at the erect position P1, folded-down position P3, and a tilted position P2 between the erect position P1 and the folded-down position P3, is provided within the turning axis support 253b. A known arrangement may be used for the stopper mechanism 260, as long as it is capable of restricting rotation of the turning shaft 241. For example, the stopper mechanism 260 may be realized by fixing a gear to the perimeter of the turning shaft 241 of the input panel 240 and attaching a spring member such as a leaf spring or the like so as to engage the teeth of the gear. Note that if the gear and spring member (a so-called ratchet mechanism) is used as the stopper mechanism 260, the flexural strength of the spring member is preferably set relatively high, so that the input panel 240 does not readily move toward the front of the automobile when performing operation input at the touch panel 240a.

The input panel 240 can be moved from the erect position P1 or tilted position P2 to the tilted position P2 or folded-down position P3 by moving the upper end thereof toward the front of the vehicle, and can be moved from the folded-down position P3 or tilted position P2 to the tilted position P2 or erect position P1 by moving the upper end thereof toward the rear of the vehicle. Note that while the input panel 240 has been configured in the present implementation to stop at the three positions of erect position P1, tilted position P2, and folded-down position P3, an arrangement may be made to stop at other positions as well.

Also, an input panel angle detection sensor 213 (see FIG. 4) to detect which of the erect position P1, tilted position P2, and folded-down position P3 the input panel 240 is at, is provided on the inner circumference face of the turning axis support 253b. The present implementation is arranged such that the display content of the display panel 230 and the display content of the liquid crystal display panel 240b change depending on the angle of the input panel 240 (erect position P1, tilted position P2, folded-down position P3) detected by the input panel angle detection sensor 213, which will be described later.

A cover member 270 formed of resin, rubber, or the like is attached to both the right and left sides of the input panel 240 in the present implementation, as illustrated in FIGS. 18 and 19. The cover member 270 has a generally U-shaped cross-sectional form, and the outer circumferential face thereof is formed in a generally arc-shaped cross-sectional form. The cover member 270 formed this way can be attached to the input panel 240 by pressing the side edges of the input panel 240 into the inner face thereof so as to be inserted therein.

Also, the upper edge of the input panel 240 according to the present implementation is formed having a generally arc-shaped cross-sectional form, in the same way as the form of the outer circumferential face of the cover member 270, as illustrated in FIGS. 16 and 19. Thus, the input panel 240 is formed with outer circumferential face of the upper edge thereof having a generally arc-shaped cross-sectional form, and the left and right sides thereof being covered by the input panel cover 253a and cover member 270 each having a generally arc-shaped cross-sectional form. Accordingly, this suppresses injury to the hand, fingers, etc., of the driver H if coming into contact with the edge of the input panel 240 when moving the input panel 240 in the front-and-rear direction of the automobile, or operating the touch panel 240a.

Further, light-emitting units 271 which emit light may be attached to the perimeter of the touch panel 240a so that the driver H can more readily recognize the perimeter of the input panel 240, as illustrated in FIG. 15. This allows the driver H to operate the input panel 240 with a clear recognition of the perimeter of the input panel 240 even if the cabin is dark inside, further suppressing injury to the hand, fingers, etc., of the driver H.

Next, the liquid crystal display panel 240b configuring the input panel 240 will be described with reference to FIGS. 13, 14, 15, and 17. In a state where the input panel 240 is positioned in the erect position P1 (see FIG. 16), and the selection image I1 is displayed on the display panel 230, a frame image I2 is displayed in a coordinated manner on the liquid crystal display panel 240b at a position corresponding to the position where the selection image I1 is displayed, as illustrated in FIG. 15. Also, the in the state that the selection image I1 and frame image I2 are displayed on the display panel 230 and input panel 240 respectively, the driver H can view the selection image I1 through the region encompassed by the frame image I2 (hereinafter referred to as "frame image region"). The present implementation is configured such that the driver H can then select the selection image I1 corresponding to the frame image I2 by touching or the like of the frame image region by way of the touch panel 240a.

Note that the present implementation is configured such that various types of images displayed on the liquid crystal display panel 240*b* can be moved by operating the input-panel-side operating unit 6, in the same way as with the first implementation. Also, the present implementation is configured such that the contents displayed on the liquid crystal display panel 240*b* are changed when the input panel 240 is moved from the erect position P1 to the tilted position P2 (see FIG. 16).

For example, moving the input panel 240 from the erect position P1 to the tilted position P2 (see FIG. 16) in a state where the frame image I2 is displayed on the liquid crystal display panel 240*b*, the frame image I2 which had been displayed at a position corresponding to the selection image I1 so far (see FIG. 15) is arrayed at the bottom of the liquid crystal display panel 240*b* in the horizontal direction. At this time, the selection image I1 which had been only text so far (e.g., image for "SET STARTING POINT AND DESTINATION", see FIG. 15) is changed to a selection image I1' of numbers and text surrounded by a frame (e.g., an image "1. SET STARTING POINT AND DESTINATION" within the frame). Each frame image I2' displayed at the bottom side of the liquid crystal display panel 240*b* is represented by a number displayed as multiple selection images I1' (e.g., "1") surrounded by a frame.

Only the multiple frame images I2' are displayed on the liquid crystal display panel 240*b* at the bottom side thereof, so the driver H can view the display panel 230 through the portion of the input panel 240 excluding the bottom side thereof. Also, the driver H can select the selection image I1' (e.g., "1. SET STARTING POINT AND DESTINATION" within the frame) corresponding to the frame image I2', by touching the numeral portion of the frame image I2' (e.g., "1") by way of the touch panel 240*a*.

Also note that according to the present implementation, moving the input panel 240 from the tilted position P2 to the folded-down position P3 (see FIG. 16), the power to the liquid crystal display panel 240*b* is turned off, so nothing is displayed on the liquid crystal display panel 240*b*.

Next, the control system of the automobile 1 will be described with reference to FIG. 4. As illustrated in FIG. 4, the control system primarily includes a display control board 200, the display panel 230, input panel 240 (touch panel 240*a* and liquid crystal display panel 240*b*), display-panel-side operating unit 5 (D-pad 5*a* and menu screen display switch 5*b*), input-panel-side operating unit 6, various types of output devices 8 such as a speaker, input panel angle detection sensor 213, and receiver 9, each of which are connected by wiring cables.

The display control board 200 is provided in the display panel 230 or the like, and has a display control CPU 201, a display control ROM 202, and a display control RAM 203. When the selection image I1 "NAVI" displayed on the "menu display screen" illustrated in FIG. 14 is touched or the like by way of the touch panel 240*a*, the display control CPU 201 outputs navigation menu screen display data corresponding to the position of the input panel 240 (i.e., which of the erect position P1, the tilted position P2, and the folded-down position P3) to the display panel 230. On the other hand, the display control CPU 201 outputs frame image display data to the liquid crystal display panel 240*b* so as to display the frame image I2 or the frame image I2'. The display control CPU 201 further outputs to the touch panel 240*a* operable region specifying data so that the portion of the frame image region surrounded by the frame image I2 or frame image I2' becomes an operable region.

Thus, in the state that the input panel 240 is in the erect position P1 or the folded-down position P3, the "NAVI MENU display screen" illustrated in FIG. 15 is displayed on the display panel 230, while in the state that the input panel 140 is in the tilted position P2, the "NAVI MENU display screen" illustrated in FIG. 17 is displayed. In the state that the input panel 240 is in the erect position P1 position, frame images I2 (see FIG. 15) are displayed on the liquid crystal display panel 240*b* at each position corresponding to the selection images I1 of the "NAVI MENU display screen". In a state where the input panel 240 is in the tilted position P2, multiple frame images I2' (FIG. 17) are displayed at the bottom side. Portions of the touch panel 240*a* which correspond to the frame images I2 or frame image I2' are each enabled as operable regions.

The display control CPU 201 determines which of the erect position P1, the tilted position P2, and the folded-down position P3 that the input panel 240 is at, based on the angle detected by the input panel angle detection sensor 213. The display control ROM 202 stores, in a hierarchical manner, "menu screen display data" (see FIG. 14) output in a case where a menu screen display signal has been input from the menu screen display switch 5*b*, "NAVI MENU display data" (see FIG. 15) output when "NAVI" has been selected from the menu display screen, and so forth, besides system programs.

The frame image display data (frame image I2 and frame image I2') is stored in a manner corresponding to the various types of image data to be displayed on the display panel 230. Also, the operable region specifying data is stored corresponding to the frame image I2 (frame image I2') stored in the frame image data. The operable region specifying data is stored in the form of coordinates data for each operable region, such as X coordinates (xa, xb) and Y coordinates (ya, yb), for example.

Thus, the touch panel 240*a* is situated next to the steering column 17 in the present implementation, and accordingly is situated so as to be easily reachable by the driver H. Accordingly, operability of the touch panel 240*a* can be improved.

Further, the present implementation is configured such that the driver H can view images displayed on the display panel 230 by way of the touch panel 240*a* attached to the steering column 17. Accordingly, when the automobile 1 is in motion, the driver H can view both the outside ahead of the vehicle, and the display panel 230 and touch panel 240*a*, with little movement of the line-of-sight direction EL therebetween. Accordingly, the display device 220 according to the present implementation enables not only operability and ease of visual recognition, but also safety to be improved.

Also, the input panel 240 according to the present implementation has the perimeter of the upper edge formed in an arc-shaped cross-sectional form, and is covered by the input panel cover 253*a* and the cover member 270 which have the lower edge and left and right sides each formed in an arc-shaped cross-sectional form. Thus, according to the present implementation, this suppresses injury to the hand, fingers, etc., for the driver H even if coming into contact with the edge of the input panel 240 when performing operation input of the touch panel 240*a*.

Further, unlike the other edges, the upper edge of the input panel 240 (touch panel 240*a* and liquid crystal display panel 240*b*) is not covered by the input panel cover 253*a* or cover member 270. Accordingly, the input panel 240 according to the present implementation can have a display region for displaying the various images on the liquid crystal display panel 240b to close to the upper edge. This region can also serve as operable regions for the passenger to operate the touch panel 240a.

The input panel 240 according to the present implementation is configured so as to enable operation input by the touch panel 240a not only in the state of the erect position P1 but also in the state of the tilted position P2. Accordingly, the driver H can move the input panel 240 to a position where operation is easy (one of erect position P1 and tilted position P2) so as to operate the touch panel 240a. Further, in the event that the driver H is not going to operate the touch panel 240a, the input panel 240 can be moved to the folded-down position P3. Thus, visual recognition of the display panel 230 when not using the touch panel 240a can be improved, and also the interior of the automobile can be made to be neater.

Further, the display panel 230 and input panel 240 (touch panel 240a) according to the present implementation are each disposed at the instrument panel 3 which is further toward the front of the vehicle as compared to the steering wheel 4, and the steering column 17, respectively. Accordingly, this arrangement does not impede with operation of the steering wheel 4, nor does it prevent an airbag from deploying in the case of collision or the like of the automobile 1 (see FIGS. 13 and 14).

Also, the input panel 240 (touch panel 240a) according to the present implementation is attached to the steering column 17 by way of the supporting member 250 (extension 252) extending in a direction opposite to the operating direction of the touch panel 240a (forward direction of the automobile), i.e., in the direction toward the rear of the automobile. In such a configuration, the operating direction of the touch panel 240a (forward direction of the automobile) and the extending direction of the extension 252 (rear direction of the automobile) are opposite directions, so pressing force toward the front of the vehicle by pressing the touch panel 240a is suitably received by the supporting member 250. Accordingly, damage and deformation of the supporting member 250 can be suppressed even without excessively raising the strength of the supporting member 250.

The input panel 240 according to the present implementation has the perimeter of the upper edge formed in an arc-shaped cross-sectional form, and is covered by the input panel cover 253a and the cover member 270 which have the lower edge and left and right sides each formed in an arc-shaped cross-sectional form. However, if at least part of the perimeter of the input panel 240 externally exposed is formed in an arc-shaped cross-sectional form, or the cover member 270 is attached, the following arrangements may be made. One example is forming all externally exposed parts of the input panel 240 an arc-shaped cross-sectional form, and not providing the cover member 270. A second example is to attach the cover member 270 to the entire exposed part without forming the edge in an arc-shaped cross-sectional form. A third example is to provide the cover member 270 to, or form in an arc-shaped cross-sectional form, only exposed parts where the passenger is likely to touch.

Also, the input panel 240 according to the present implementation has been described as being movable between the erect position P1 and the folded-down position P3, but an arrangement may be made where the input panel 240 is fixed at the erect position P1 and is immovable.

Further, the input panel 240 according to the present implementation has been described as being attached to the steering column 17, which is an example of a vehicle-mounted part, by way of the supporting member 250, but the input panel 240 may be directly attached to the vehicle-mounted part. In this case, the input pane 240 may be movable relative to the vehicle-mounted part to the erect position P1, tilted position P2, and folded-down position P3, or may be fixed immovably at the erect position P1.

Also, description has been made with the present implementation where the display panel 230 and input panel 240 are attached to the instrument panel 3 and the steering column 17 respectively. However, as long as the touch panel 240a is situated on the line-of-sight direction EL of the passenger viewing the display panel 230, a display panel 230' may be provided, for example, at the middle of the instrument panel 3 in the width direction, and an input panel 240' provided via a supporting member 250' attached to the instrument panel 3, as illustrated in FIG. 12. In this case, at least part of the externally exposed peripheral edge of the input panel 240' is preferably formed in an arc-shaped cross-sectional form, or covered by the cover member 270.

Further, an arrangement may be made where the attachment position of the display panel 230 is unchanged but just the input panel is attached to the steering wheel 4. This configuration can be realized by attaching a generally half-circle shaped input panel 240' (touch panel 240a' and liquid crystal display panel 240b') to the lower opening perimeter edge of the upper space 4a, either directly or by hinges (supporting member), as illustrated in FIGS. 20A and 20B. It is sufficient in this case for a generally U-shaped opening S through which the hand of the driver H can be passed, to be formed between the steering wheel 4 and the input panel 240'. In this case, at least part of the externally exposed peripheral edge of the input panel 240' is preferably formed in an arc-shaped cross-sectional form, or covered by the cover member 270, as described above. This enables injury to the hands, fingers, etc., of the driver H to be suppressed when operating the steering wheel 4, besides when operating the touch panel 240a.

While the present implementation has been described as the display panel 230 being provided further toward the front of the automobile as compared to the touch panel 240a, an arrangement may be made where the display panel is situated further toward the rear of the automobile as compared to the touch panel 240a, in the same way as with the above-described second implementation, as long as the touch panel 240a is situated on the line-of-sight direction EL of the passenger, and also situated between the instrument panel 3 and the steering wheel 4 (see FIG. 12). In this example, a display panel 230A is provided hanging down from the ceiling of the cabin in front of the eyes of the driver H. This configuration does not impede operation of the steering wheel 4, and operability, ease of visual recognition, and safety can be improved. In the case of this attaching the display panel 230A to this position, at least part of the externally exposed peripheral edge is preferably formed in an arc-shaped cross-sectional form, or covered by a member similar to the cover member 270, as described above. Further, in a case of disposing the display panel 230A at the position illustrated in FIG. 12, the display panel 230A is preferably attached to the ceiling member in a turnable manner. The reason is that in the case of collision or the like of the automobile 1, the display panel 230A will come into contact with the airbag or the driver H and turn, and accordingly the airbag is not impeded from deploying.

Fourth Implementation

Generally, if an observer (passenger) has focused on an object to be observed at the far side, and in this state views an object to the observed at the near side at the same time, binocular disparity causes the object to be observed at the near side to appear in double or blurred.

Figure 23:
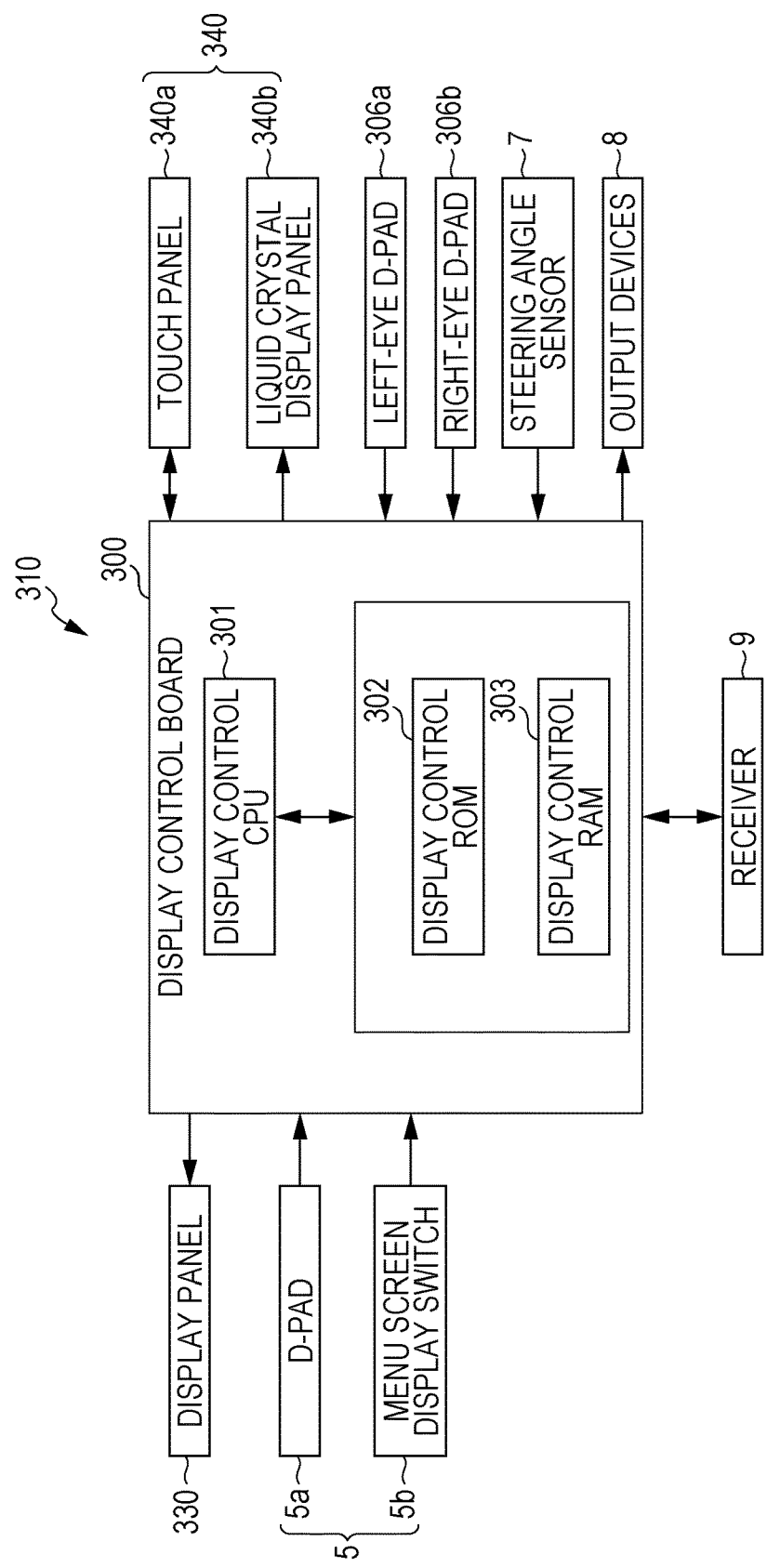
FIG. 23 is a block diagram for describing a control system provided to an automotive display system.
Figure 24:
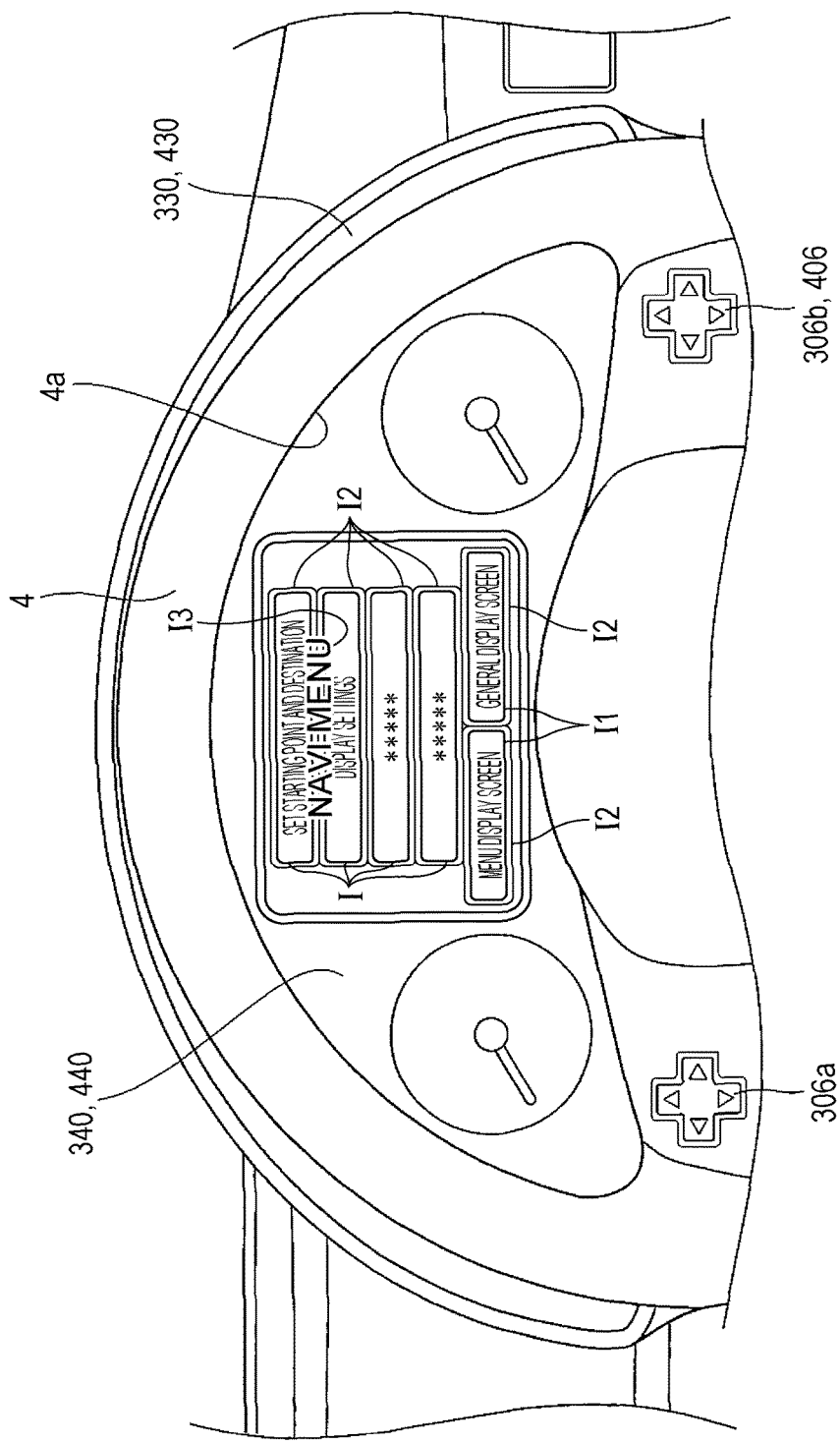
FIG. 24 is a diagram describing a "navigation menu screen", as an example of an image displayed on the display panel.
Figure 25A:
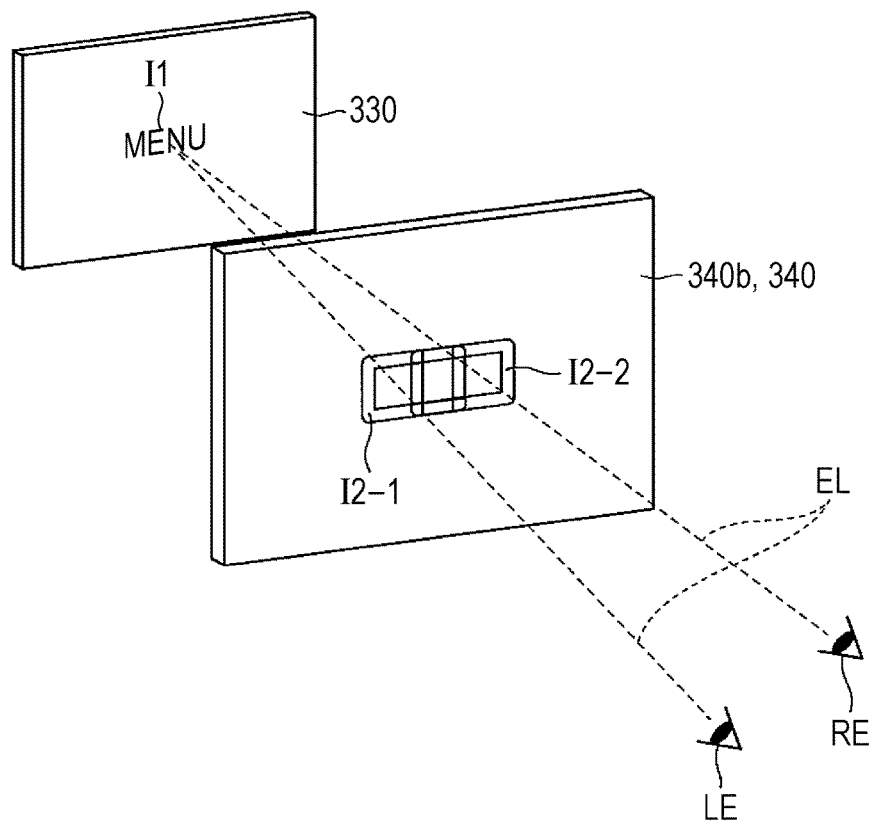
Figure 25B:
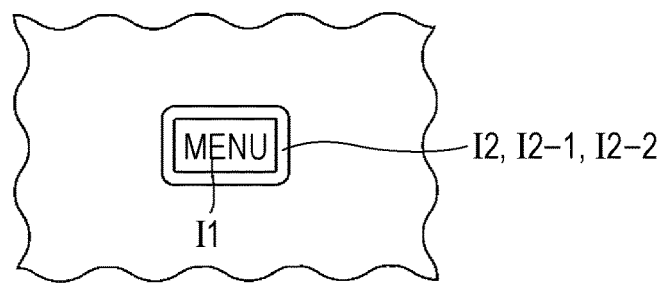

A modification of the above implementation s (a fourth implementation) conceived to deal with this problem will be described with reference to FIGS. 1 and 21 through 25B. FIG. 21 is a side view illustrating the positional relation between driver, display panel, and input panel, in a fourth implementation of the present invention, FIG. 22 is a front view illustrating the display panel and input panel as viewed from the driver's seat, FIG. 23 is a block diagram for describing a control system provided to an automotive information display system, and FIG. 24 is a diagram describing a "navigation menu screen", as an example of an image displayed on the display panel, FIGS. 25A and 25B are diagrams illustrating an image displayed on the input panel, in which FIG. 25A is a perspective view for describing a case of the passenger viewing images displayed on each of the input panel and display panel, and FIG. 25B is a diagram for describing the image as viewed from the passenger in the state illustrated in FIG. 25A. Note that in the following description, configurations the same as those in the implementation s described above are denoted with the same reference numerals, and description thereof will be omitted.

A display device 310 according to the present implementation has a display panel 330 and input panel 340, in the same way as with the first implementation described above, as illustrated in FIG. 21. Note that the display device 310 and the display panel 330 correspond to "display device for a vehicle" and "first display unit" according to an aspect of the invention.

As illustrated in FIGS. 1, 21, and 22, the display panel 330 is a display device such as a liquid crystal display device, and is attached to the instrument panel 3 which is toward the front side of the automobile from the driver's seat 2, in the same way as the display panel 30 according to the first implementation. The driver H can see images displayed on the display screen of the display panel 330 through the upper space 4a of the steering wheel 4. In the present implementation, images displayed on the display panel 330 can be moved by operating the D-pad 5a, and a "menu display screen" such as illustrated in FIG. 24 can be displayed on the display panel 330 by pressing the menu screen display switch 5b, in the same way as with the first implementation.

Next, the input panel 340 will be described with reference to FIGS. 21, 22, and 24 through 25B. As illustrated in FIGS. 21 and 22, the input panel 340 includes a touch panel 340a, and a liquid crystal display panel 340b which is layered on the side of the touch panel 340a closer to the front of the automobile, in the same way as with the input panel 40 according to the first implementation. The touch panel 340a and liquid crystal display panel 340b are both formed of a transparent material. Known arrangements may be used for each. The liquid crystal display panel 340b above corresponds to the "second display unit" in the Summary of the Invention.

The input panel 340 has generally the same shape as the upper space 4a of the steering wheel 4, and is fixed to the opening perimeter of the upper space 4a. That is to say, in the present implementation, the driver H can view the image displayed on the display panel 330 via the input panel 340.

When selection images I1 are displayed on the display panel 330, a frame image I2 having the shape of a frame is displayed on the liquid crystal display panel 340b at a position corresponding to the selection images I1 in a coordinated manner. Also, in a state where the selection images I1 and frame image I2 are displayed on the display panel 330 and input panel 340, the driver H can view the selection images I1 through the region encompassed by the frame image I2 (frame image region).

The frame image I2 displayed on the liquid crystal display panel 340b will be described with reference to FIGS. 21, and 25A and 25B. The liquid crystal display panel 340b according to the present implementation is configured to display a selection image I1 (e.g., a text image "MENU") on the display panel 330 such that two images, left eye LE frame image I2-1 and right eye RE frame image I2-2, which are the same image both shifted in the left and right directions by a predetermined amount, as illustrated in FIG. 25A. The left eye LE frame image I2-1 and right eye RE frame image I2-2 can be respectively displayed on the line-of-sight direction EL of the left eye LE and the line-of-sight direction EL of the right eye RE, in a state where the driver H is focused on a particular selection image I1 displayed on the display panel 330.

Now, if the driver H views a particular selection image I1 (e.g., the text image "MENU") in a state where the frame image I2-1 and frame image I2-2 are respectively displayed on the line-of-sight direction EL of the left eye LE and the line-of-sight direction EL of the right eye RE, the frame image I2-1 and frame image I2-2 are naturally imaged as illustrated in FIG. 25B. Thus, the driver H sees this as one frame image I2 being situated (in a three-dimensional manner) around the particular selection image I1.

The present implementation is configured such that the driver H can select the selection image I1 corresponding to the frame image I2 by touching or the like the frame image region of the frame image I2 by way of the touch panel 340a (see FIG. 25A). For example, upon the driver H touching or the like the frame image region of either one of the frame image I2-1 and frame image I2-2 illustrated in FIG. 25A by way of the touch panel 340a (see FIG. 25A), the selection image I1 "MENU" is selected. Thus the display of the display panel 330 switches to the "menu display screen" (see FIG. 22). Note that the present implementation is configured such that when the content displayed on the display panel 330 changes, the frame image I2 displayed on the liquid crystal display panel 340b also changes in a coordinated manner.

The liquid crystal display panel 340b is configured to display various types of images besides the frame image I2 as described above. For example, in the "NAVI MENU screen" illustrated in FIG. 24, in addition to the frame image I2 an image (text image) I3 "NAVI MENU" is displayed so as to be superimposed on the selection image I1 displayed on the display panel 330. This sort of image I3 is transparently displayed, so as to avoid impeding with the ease of visual recognition of the selection image I1 as much as possible.

This configuration according to the present implementation where the selection image I1 and image I3 are displayed separately on the display panel 330 and liquid crystal display panel 340b allows the multiple selection images I1 to be displayed over the entire display screen area of the display panel 330. That is to say, the display size of the selection image I1 can be displayed larger than in the present implementation as compared to a case of displaying the image I3 on the same screen at the same time. Note that the image I3 displayed on the liquid crystal display panel 340b is not restricted to text, and may be shapes or the like. Moreover, the image I3 may also be displayed as a right eye image and a left eye image, in the same way as the frame image I2.

The frame image I2-1 and frame image I2-2 displayed on the liquid crystal display panel 340b as illustrated in FIGS. 24 and 25A can be moved by operating a left-eye D-pad 306a and right eye D-pad 306b provided to the steering wheel 4 in a manner distanced from one another in the horizontal direction. The left-eye D-pad 306a and the right eye D-pad 306b are each cross-shaped switches similar to the D-pad 5a of the display-panel-side operating unit 5. The driver H can move the frame image I2-1 displayed on the liquid crystal display panel 340b by pressing any one of the upper end, lower end, left end, and right end of the left-eye D-pad 306a. The driver H can move the frame image I2-2 using the right eye D-pad 306b in the same way. If the driver H continues to press the left end of the left-eye D-pad 306a (right eye D-pad 306b), the frame image I2-1 (frame image I2-2) displayed on the liquid crystal display panel 240b continues to be scrolled to the left as long as the driver H is pressing. While the present implementation is configured so that the frame image I2-1 (frame image I2-2) can be moved by operating the left-eye D-pad 306a (right eye D-pad 306b), an arrangement may be made where the frame image I2-1 (frame image I2-2) is moved by operation input to the touch panel 340a (e.g., a flicking operation).

While the driver H can situate the frame image I2 (frame image I2-1 and frame image I2-2) around the selection image I1 displayed on the display panel 330 by operating the left-eye D-pad 306a and right eye D-pad 306b (see FIG. 25A), such positional adjustment may be performed by vertically moving the steering wheel 4, or performing operation from the D-pad 5a of the display-panel-side operating unit 5, besides operation by the left-eye D-pad 306a and right eye D-pad 306b.

Next, the control system provided in the automobile 1 will be described with reference to FIG. 23. As illustrated in FIG. 23, the control system primarily includes a display control board 300, the display panel 330, the input panel 340 (touch panel 340a and liquid crystal display panel 340b), the display-panel-side operating unit 5 (D-pad 5a and menu screen display switch 5b), the left-eye D-pad 306a and right eye D-pad 306b, the steering angle sensor 7, various types of output devices 8 such as a speaker, and a receiver 9, which are connected by wiring cables.

The display control board 300 is provided in the display panel 330 or the like, and has a display control CPU 301, a display control ROM 302, and a display control RAM 303. The display control CPU 301 corresponds to the "control unit" in the Summary of the Invention.

In a case where a menu screen image display signal is input by pressing of the menu screen display switch 5b for example, the display control CPU 301 outputs menu screen display data to the display panel 330. On the other hand, the display control CPU 301 outputs to the liquid crystal display panel 340b frame image display data to display the frame image I2-1 and frame image I2-2 and text image data to display the image I3. Further, the display control CPU 301 outputs to the touch panel 340a operable region specifying data so that the part corresponding to the frame image region of the frame image I2-1 and the part corresponding to the frame image region of the frame image I2-2 each become operable regions (see FIG. 25A). This, the "menu display screen" is displayed on the display panel 330, the frame image I2-1 and frame image I2-2 are displayed on the liquid crystal display panel 340b at positions corresponding to each selection image I1 in the "menu display screen", and also the image I3 is displayed. Further, the part of the liquid crystal display panel 340b corresponding to the frame image region of the frame image I2-1 and the part corresponding to the frame image region of the frame image I2-2 each are enabled as operable regions.

In the same way as with the display control CPU 101 according to the first implementation described above, the display control CPU 301 outputs to the liquid crystal display panel 340b and touch panel 340a a non-display signal to not display the frame image I2 (frame image I2-1 and frame image I2-2) (see FIG. 25A), and an operation disable signal to disable the enabled operable regions, respectively, based on steering angle data input from the steering angle sensor 7 which detects a steering angle θ of the steering wheel 4.

The display control ROM 302 stores, in addition to system programs, various types of image data to be output to the display panel 330, frame image display data and text image data to be output to the liquid crystal display panel 340b, and operable region specifying data for specifying operable regions on the touch panel 340a. The frame image display data and text image data are stored in a manner corresponding to the various types of image data displayed on the display panel 330. Also, the operable region specifying data is stored corresponding to the frame image I2-1 and frame image I2-2 stored in the frame image display data. This operable region specifying data is stored in the form of coordinates data for each operable region, such as X coordinates (xa, xb) and Y coordinates (ya, yb), for example.

The display control RAM 303 is provided with a first display panel image display position storage region, a left eye image display position storage region, and a right eye image display position storage region. The first display panel image display position storage region is a region storing data which is changed by the display position of an image displayed on the display panel 330 having been changed by the D-pad 5a being operated. The left eye image display position storage region is a region storing data which is changed by the display position of a left eye image (frame image I2-1) having been changed by the left-eye D-pad 306a being operated. The right eye image display position storage region is a region storing data which is changed by the display position of a right eye image (frame image I2-2) having been changed by the right eye D-pad 306b being operated. Such changed data is overwritten and stored each time the position of the image is changed. Images displayed on the display panel 330 and liquid crystal display panel 340b are displayed based on data stored in the storage regions. The operable region of the touch panel 340a is changed in accordance with change in the display positions of the frame image I2-1 and frame image I2-2.

Thus, according to the present implementation, this configuration according to the present implementation where the selection image I1 and image I3 are displayed separately on the display panel 330 and liquid crystal display panel 340b allows the multiple selection images I1 to be displayed over the entire display screen area of the display panel 330, in the same way as the above-described implementation. That is to say, the display size of the selection image I1 can be displayed larger than in the present implementation as compared to a case of displaying a selection image I1 and image I3 on the same screen at the same time. Moreover, the present implementation is configured such that the selection images I1 displayed on the display panel 330 can be viewed via the frame images I2 displayed on the input panel 340, so both the selection images I1 and frame images I2 can be viewed at the same time without hardly moving the line-of-sight direction EL at all.

Further, the present implementation is configured such that a frame image I2-1 (left eye image) and a frame image I2-2 (right eye image) are displayed on the input panel 340 as a binocular disparity image. This prevents the frame image I2 displayed on the liquid crystal display panel 340b of the input panel 340 from appearing in double when focusing on a particular selection image I1 displayed on the display panel 330. Thus, according to the present implementation, the driver H can view multiple images of which the display sizes are large (e.g., selection image I1 and image I3) at the same time without moving the line-of-sight direction EL, and can also clearly view images (frame images I2) displayed on the liquid crystal display panel 340b.

The present implementation has been described as a configuration where the frame image I2-1 and frame image I2-2 are operated by the left-eye D-pad 306a and right eye D-pad 306b respectively, so as to be situated on the line-of-sight direction EL of the left eye ELLE and the line-of-sight direction EL of the right eye RE when focusing on a particular selection image I1. Other arrangements may be made as well, such as, for example, an arrangement where a camera 54 which detects the position of the eyes (right eye and left eye) of the driver H is attached to a predetermined position of the instrument panel 3 (see FIG. 22). The frame image I2-1 and frame image I2-2 are then automatically moved based on the positions of the eyes of the driver H imaged by this camera 54, so as to be situated on the line-of-sight direction EL of the left eye ELLE and the line-of-sight direction EL of the right eye RE. Another exemplary arrangement is to provide a sensor which detects the position of the driver's seat 2, instead of the camera 54. In this case, the positions of the eyes of the driver H are estimated based on the seat position detected by the sensor, and the frame image I2-1 and frame image I2-2 are automatically moved based on the estimated positions, so as to be situated on the line-of-sight direction EL of the left eye ELLE and the line-of-sight direction EL of the right eye RE. Note that the camera 54 and so forth described above correspond to "detecting unit" herein.

Also, the present implementation has been described as the touch panel 340a serving as an operating unit being provided at the input panel 340 side, but the touch panel 340a may be provided to the display panel 330 side instead.

Fifth Implementation

Figure 26:
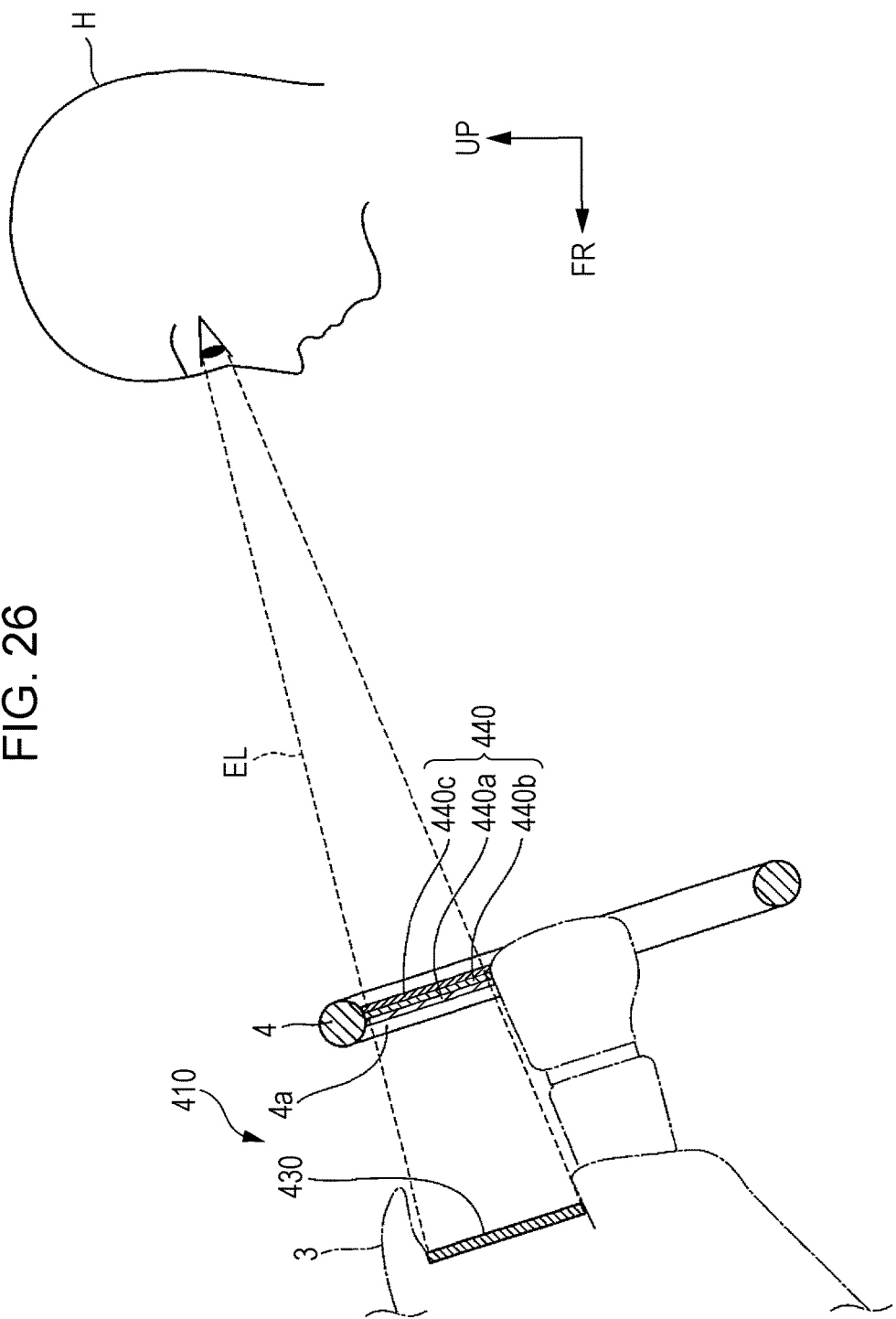
FIG. 26 is a side view illustrating the positional relation between driver, display panel, and input panel, in a fifth implementation of the present invention.
Figure 27:
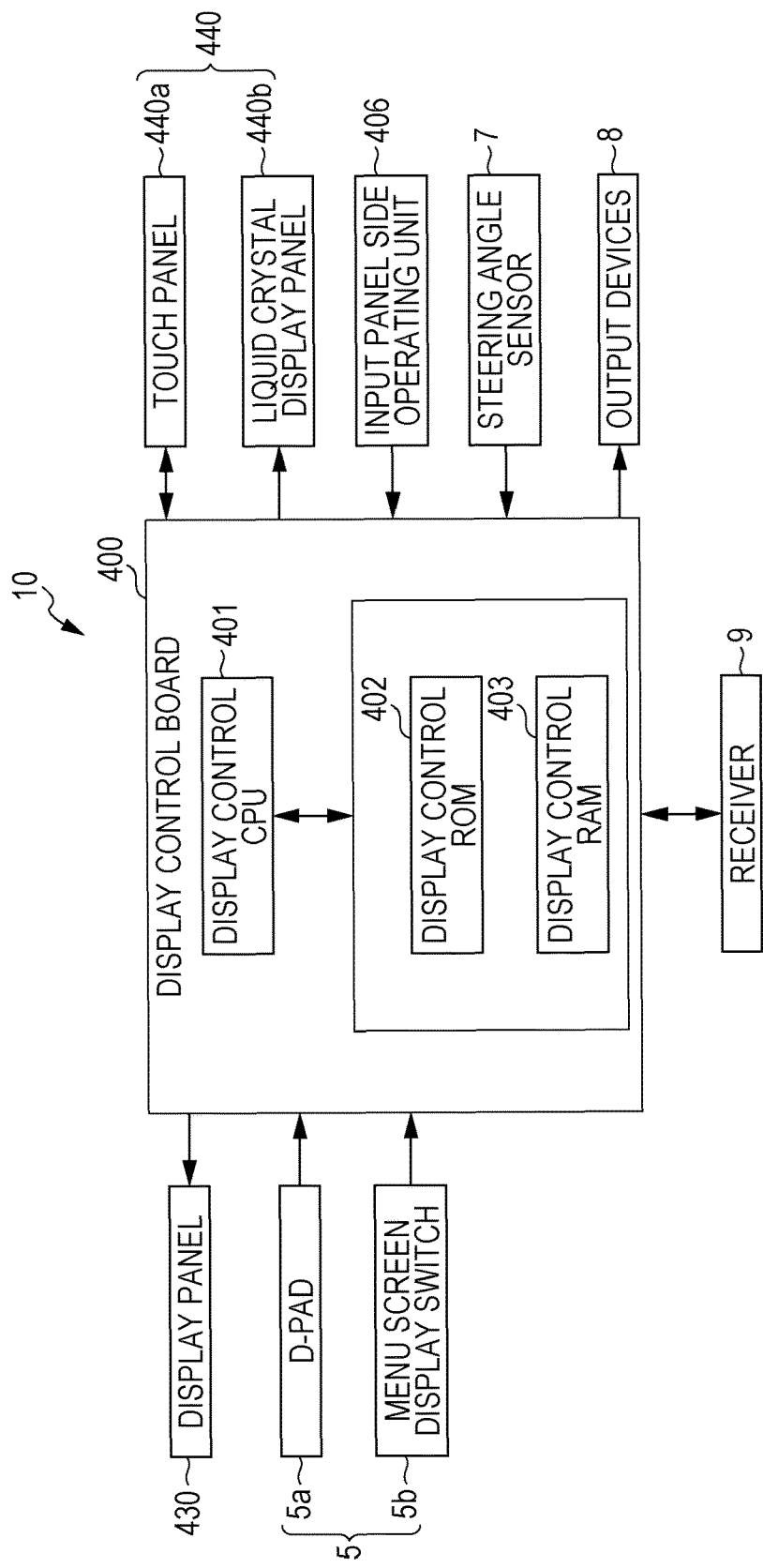
FIG. 27 is a block diagram for describing a control system provided to an automotive control system.
Figure 28:
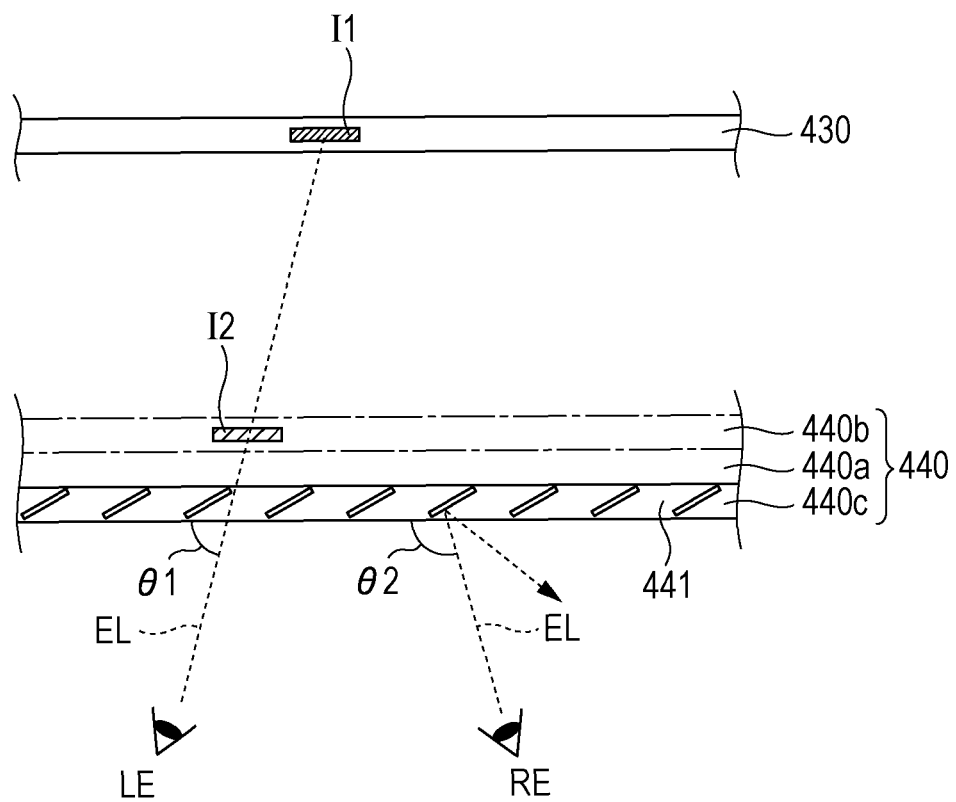
FIG. 28 is a plan view illustrating the positional relation between driver, display panel, and input panel.

A fifth implementation, which is a modification of the fourth implementation, will be described with reference to FIGS. 22, 24, and 26 through 28. FIG. 26 is a side view illustrating the positional relation between driver, display panel, and input panel, in the fifth implementation of the present invention, FIG. 27 is a block diagram for describing a control system provided to an automotive control system, and FIG. 28 is a plan view illustrating the positional relation between driver, display panel, and input panel. Note that in the following description, configurations the same as those in the implementations described above are denoted with the same reference numerals, and description thereof will be omitted.

An automotive display device 410 according to the present implementation is installed in the cabin of the automobile 1, and has a display panel 430 and input panel 440, as illustrated in FIGS. 22 and 26. The display panel 430 and input panel 440 are situated distanced from each other in the front-to-back direction of the automobile. Note that the display device 410 and the display panel 430 correspond to "display device for a vehicle" and "first display unit" in the Summary of the Invention.

As illustrated in FIGS. 22, 24, and 26, the display panel 430 is a display device such as a liquid crystal display device, and is attached to the instrument panel 3 which is toward the front side of the automobile from the driver's seat 2, in the same way as the display panel 330 according to the fourth implementation. The driver H can see images displayed on the display screen of the display panel 430 through the upper space 4a of the steering wheel 4. In the present implementation, images displayed on the display panel 430 can be moved by operating the D-pad 5a, and a "menu display screen" such as illustrated in FIG. 24 can be displayed on the display panel 430 by pressing the menu screen display switch 5b, in the same way as with the fourth implementation.

Next, the input panel 440 will be described with reference to FIGS. 22, 24, and 26 through 28. As illustrated in FIGS. 22 and 26, the input panel 440 includes a touch panel 440a capable of receiving operation input by bringing a finger or the like into contact with or into close proximity with the operating surface, a liquid crystal display panel 440b which is layered on the side of the touch panel 440a closer to the front of the automobile, and a louver filter 440c which is layered on the side of the touch panel 440a closer to the rear of the automobile. The touch panel 440a and liquid crystal display panel 440b are both formed of a transparent material, and known arrangements may be used for each. The louver filter 440c is also formed of a transparent material, in the same way as with the touch panel 440a and liquid crystal display panel 440b. Note that the liquid crystal display panel 440b and louver filter 440c above correspond to "second display unit" and "optical filter" in the Summary of the Invention.

The input panel 440 has generally the same shape as the upper space 4a of the steering wheel 4, and is fixed to the opening perimeter of the upper space 4a. When selection images I1 are displayed on the display panel 430, a frame image I2 having the shape of a frame is displayed on the liquid crystal display panel 440b at a position corresponding to the selection images I1 in a coordinated manner. Also, in a state where the selection images I1 and frame image I2 are displayed on the display panel 430 and input panel 440, the driver H can view the selection images I1 through the region encompassed by the frame image I2 (frame image region). The present implementation is configured such that the driver H can select the selection image I1 corresponding to the frame image I2 by touching or the like the frame image region of the frame image I2 by way of the touch panel 440a.

Next, the louver filter 440c will be described with reference to FIG. 28. Note that the term "angle" as used in the following description means, of angles formed between incident light traveling from the rear toward the front of the automobile and the plane of the louver filter 440c toward the rear of the automobile, the angle toward the left side in planar view. The louver filter 440c is formed of a resin such as polyethylene terephthalate (PET) for example, and includes multiple louver leaves 441 within, as illustrated in FIG. 28.

The louver leaves 441 include deflecting faces (reflecting faces) slanted towards the left rear side of the automobile, and are arrayed at predetermined intervals in the left-right direction. The louver leaves 441 are arranged such that incident light traveling from the rear toward the front of the automobile is transmitted as long as the angle $\theta$ as to the louver filter 440c does not exceed a predetermined angle (e.g., 75 degrees). Light exceeding this predetermined angle is reflected.

In a case where this predetermined angle is set to 75 degrees for example, an angle $\theta 1$ where the line-of-sight direction EL of the left eye LE and the louver filter 440c cross when viewing the input panel 440 with the left eye LE does not readily exceed the predetermined angle. Accordingly, the left eye LE can readily easily view the images displayed on the liquid crystal display panel 440b (frame image I2 and image I3) and the images displayed on the display panel 430 (selection images I1) through the louver filter 440c.

On the other hand, in a case where this predetermined angle is set to 75 degrees as described above, an angle θ2 where the line-of-sight direction EL of the right eye RE and the louver filter 440c cross when viewing the input panel 440 with the right eye RE readily exceeds the predetermined angle. Accordingly, the line-of-sight direction EL of the right eye RE is changed (reflected) by the louver filter 440c, so the images displayed on the liquid crystal display panel 440b (frame image I2 and image I3) and the images displayed on the display panel 430 (selection images I1) are not readily viewed through the louver filter 440c.

While the present implementation has been configured such that the images displayed on the display panel 430 and the images displayed on the liquid crystal display panel 440b are more readily viewed when viewing the input panel 440 with the left eye LE as compared to when viewing the input panel 440 with the right eye RE, the opposite arrangement may be used instead. Also, while the predetermined angle has been set to 75 degrees in the present implementation, this angle may be changed as appropriate, as long as one eye cannot readily view the images displayed on the display panel 430 and liquid crystal display panel 440b, or not at all.

The present implementation is configured so that the frame image I2 displayed on the liquid crystal display panel 440b can be moved by operating an input-panel-side operating unit 406 provided at a predetermined position on the steering wheel 4, as illustrated in FIG. 24. This input-panel-side operating unit 406 is a cross-shaped switch similar to the D-pad 5a. The driver H can move the frame image I2 displayed on the liquid crystal display panel 440b by pressing any one of the upper end, lower end, left end, and right end. The driver H can thus situate the frame image I2 on the line-of-sight direction EL of the left eye LE viewing the selection image I1 by operating the input-panel-side operating unit 406 (see FIG. 28). Once this position adjustment is performed, in the present implementation, subsequent display of the frame image I2 and image I3 is performed based on the changed position.

Next, the control system provided in the automobile 1 will be described with reference to FIG. 27. As illustrated in FIG. 27, the control system primarily includes a display control board 400, the display panel 430, the input panel 440 (touch panel 440a and liquid crystal display panel 440b), the display-panel-side operating unit 5 (D-pad 5a and menu screen display switch 5b), the input-panel-side operating unit 406, the steering angle sensor 7, various types of output devices 8 such as a speaker and the like, and a receiver 9, which are connected by wiring cables.

The display control board 400 is provided in the display panel 430 or the like, and has a display control CPU 401, a display control ROM 402, and a display control RAM 403. The display control CPU 401 reads in a system program and so forth stored in the display control ROM 402 beforehand, and based on information input from the touch panel 440a and the like, outputs image data to the display panel 430 and liquid crystal display panel 440b, and also outputs operable region specifying data to the touch panel 440a.

In a case where a menu image display signal is input by pressing of the menu screen display switch 5b for example, the display control CPU 401 outputs menu screen display data to the display panel 430. On the other hand, the display control CPU 401 outputs to the liquid crystal display panel 440b frame image display data to display the frame image I2, and text image data to display the image I3.

The display control ROM 402 stores, in addition to system programs, various types of image data to be output to the display panel 430, frame image display data and text image data to be output to the liquid crystal display panel 440b, and operable region specifying data for specifying operable regions on the touch panel 440a. The frame image display data and text image data are stored in a manner corresponding to the various types of image data displayed on the display panel 430. Also, the operable region specifying data is stored corresponding to the frame image I2 stored in the frame image display data. This operable region specifying data is stored in the form of coordinates data for each operable region, such as X coordinates (xa, xb) and Y coordinates (ya, yb), for example.

The display control RAM 403 is provided with a first display panel image display position storage region, and a second display panel image display position storage region. The first display panel image display position storage region is a region storing data which is changed by the display position of an image displayed on the display panel 430 having been changed by the D-pad 5a being operated. The second display panel image display position storage region is a region storing data which is changed by the display position of the frame image I2 and image I3 having been changed by the input-panel-side operating unit 406 being operated. Such changed data is overwritten and stored each time the position of the image is changed. Images displayed on the display panel 430 and liquid crystal display panel 440b are displayed based on data stored in the storage regions. The operable region of the touch panel 440a is changed in accordance with change in the display position of the frame image I2.

Thus, according to the present implementation, the louver filter 440c which enables light on the line-of-sight direction EL of the left eye LE of the driver H viewing the display panel 430 to be transmitted, while transmitting little or no light on the line-of-sight direction EL of the right eye RE of the driver H, is layered on the face of the liquid crystal display panel 440b toward the rear of the automobile. Thus, a situation where the frame image I2 and image I3 displayed on the liquid crystal display panel 440b appear in double to the diver H viewing images displayed on the display panel 430 at the near side can be prevented.

Accordingly, according to the present implementation, the driver H can view multiple images of which the display sizes are large (e.g., selection image I1 and image I3) at the same time without moving the line-of-sight direction EL, and can also clearly view images (frame image I2 and image I3) displayed on the liquid crystal display panel 440b. While the touch panel 440a serving as an operating unit is provided at the input panel 440 in the present implementation, the touch panel 440a may be provided at the display panel 430 instead.

Implementations of the invention made by the present inventor have been described above, but the description and drawings which constitute a part of this disclosure are not intended to restrict the present invention. It is needless to say that all other implementations, exemplary implementations, operational technology, and so forth, are all encompassed by the scope of the present invention.

The invention claimed is:

1. A display device for a vehicle comprising: an input panel that receives an operation input from a driver and displays an operable region image, wherein the input panel is formed of a transparent or semi-transparent material; and a display that displays various types of information based on the operation input from the input panel, wherein the various types of information comprises a selection image; wherein the input panel and the display are disposed separated from each other; wherein the input panel is situated between the eyes of the driver performing the operation input and the display, situated at a height above an axis of rotation of a steering wheel, and situated at a position overlaying the display in the line of sight of the driver performing operation input; wherein the operable region image is superimposed on the selection image in the line of sight of the driver performing operation input and comprises an outline encompassing the selection image in the line of sight of the driver performing operation input; wherein the position of boundaries of the operable region image are adjustable in a vertical or horizontal direction on the input panel, relative to the edges of the input panel; and wherein the position of the boundaries of the operable region image are automatically adjusted according to a motion of the line of sight of the driver detected by a detection sensor.

2. The display device for a vehicle according to claim 1, wherein the input panel is a touch panel including an operating surface, to detect whether the operation input has been performed as to the operating surface by touching or coming into proximity.

3. The display device for a vehicle according to claim 1, wherein the input panel is situated within a range reachable by driver seated in a seat.

4. The display device for a vehicle according to claim 1, wherein the input panel is attached to the steering wheel situated in front of a driver's seat.

5. The display device for a vehicle according to claim 1, wherein the input panel has at least a part of the outer perimeter thereof which is covered by a cover member having an arc-shaped cross-sectional shape or is formed into an arc-shaped cross-sectional shape.

6. The display device for a vehicle according to claim 5, wherein the input panel is attached to a vehicle-mounted part via the cover member.

7. The display device for a vehicle according to claim 1, wherein the input panel is disposed between an instrument panel situated toward the front of the driver's seat, and the steering wheel, the instrument panel and the steering wheel being used to configure a vehicle body.

8. The display device for a vehicle according to claim 7, wherein the input panel is attached to either one of a steering column which rotatably supports a steering shaft to which the steering wheel is attached, and the instrument panel, the steering column and the instrument panel being vehicle-mounted parts.

9. The display device for a vehicle according to claim 7, wherein the input panel is attached to a vehicle-mounted part by way of a supporting member; and wherein the supporting member includes an extension extending in generally the same direction as an operating direction in which the operation input is performed, a vehicle-mounted part attaching unit linked to one end of the extension toward the front side of the vehicle, and attached to the vehicle-mounted part, and an input panel attaching unit linked to the other end of the extension toward the rear side of the vehicle, and attached to the input panel.

10. A display device for a vehicle comprising: a first display situated toward the front of the vehicle from a driver seated in a seat; and a second display formed of a transparent or semi-transparent material, the second display being disposed separated from the first display; wherein the second display is situated between the eyes of the driver viewing a display screen of the first display and the first display, the second display is situated at a height above an axis of rotation of a steering wheel, and the second display is situated at a position overlaying the first display in the line of sight of the driver viewing the display screen of the first display; wherein the first display displays at least one selection image and the second display displays at least one operable region image, wherein the at least one operable region image is superimposed on the at least one selection image in the line of sight of the driver viewing the display screen of the first display and comprises an outline encompassing the at least one selection image in the line of sight of the driver viewing the display screen of the first display; wherein the position of boundaries of the operable region image are adjustable in a vertical or horizontal direction on the input panel, relative to the edges of the input panel; and wherein the position of the boundaries of the operable region image are automatically adjusted according to a motion of the line of sight of the driver detected by a detection sensor.

11. The display device for a vehicle according to claim 1, wherein the position of the boundaries of the selection image are adjustable in a vertical or horizontal direction, relative to the edges of the display.

12. The display device for a vehicle according to claim 11, wherein the position of the boundaries of the selection image are adjustable in a vertical or horizontal direction by the driver performing operation input.

13. The display device for a vehicle according to claim 1, wherein the position of the boundaries of the operable region image are adjustable in a vertical or horizontal direction by the driver performing operation input.

14. The display device for a vehicle according to claim 1, wherein the selection image displayed on the display is visible through the input panel in the line of sight of the driver performing operation input.

* * * * *